United States Patent
Tomasi et al.

(10) Patent No.: US 6,710,770 B2
(45) Date of Patent: Mar. 23, 2004

(54) QUASI-THREE-DIMENSIONAL METHOD AND APPARATUS TO DETECT AND LOCALIZE INTERACTION OF USER-OBJECT AND VIRTUAL TRANSFER DEVICE

(75) Inventors: Carlo Tomasi, Palo Alto, CA (US); Abbas Rafii, Palo Alto, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

(21) Appl. No.: 09/948,508

(22) Filed: Sep. 7, 2001

(65) Prior Publication Data

US 2002/0021287 A1 Feb. 21, 2002

Related U.S. Application Data

(63) Continuation-in-part of application No. 09/502,499, filed on Feb. 11, 2000.
(60) Provisional application No. 60/287,115, filed on Apr. 27, 2001, provisional application No. 60/272,120, filed on Feb. 27, 2001, and provisional application No. 60/231,184, filed on Sep. 7, 2000.

(51) Int. Cl.[7] .................................................. G09G 5/00
(52) U.S. Cl. ...................... 345/168; 345/156; 345/158; 345/169; 345/173
(58) Field of Search .............................. 345/156, 158, 345/175, 157, 163, 39, 169, 170, 173

(56) References Cited

U.S. PATENT DOCUMENTS

| | | | |
|---|---|---|---|
| 4,507,557 A | 3/1985 | Tsikos | 250/341 |
| 4,855,590 A | 8/1989 | Bures et al. | 250/221 |
| 5,196,835 A * | 3/1993 | Blue et al. | 345/175 |
| 5,317,140 A | 5/1994 | Dunthorn | 250/221 |
| 5,528,263 A | 6/1996 | Platzker et al. | 345/156 |
| 5,767,842 A | 6/1998 | Korth | 345/168 |
| 5,909,210 A | 6/1999 | Knox et al. | 345/168 |
| 5,936,614 A | 8/1999 | Waters | 345/173 |
| 6,043,805 A * | 3/2000 | Hsieh | 345/158 |
| 6,091,405 A * | 7/2000 | Lowe et al. | 345/175 |
| 6,252,598 B1 * | 6/2001 | Segen | 345/158 |
| 6,266,048 B1 | 7/2001 | Carau, Sr. | 345/168 |
| 6,281,878 B1 | 8/2001 | Montellese | 345/156 |
| 6,323,942 B1 | 11/2001 | Bamji | 356/5.01 |
| 6,594,023 B1 * | 7/2003 | Omura et al. | 356/620 |
| 2001/0030642 A1 * | 10/2001 | Sullivan et al. | 345/157 |

* cited by examiner

Primary Examiner—Steven Saras
Assistant Examiner—Alecia D. Nelson
(74) Attorney, Agent, or Firm—Michael A. Kaufman; Dorsey & Whitney LLP

(57) ABSTRACT

A system used with a virtual device inputs or transfers information to a companion device, and includes two optical systems OS1, OS2. In a structured-light embodiment, OS1 emits a fan beam plane of optical energy parallel to and above the virtual device. When a user-object penetrates the beam plane of interest, OS2 registers the event. Triangulation methods can locate the virtual contact, and transfer user-intended information to the companion system. In a non-structured active light embodiment, OS1 is preferably a digital camera whose field of view defines the plane of interest, which is illuminated by an active source of optical energy. Preferably the active source, OS1, and OS2 operate synchronously to reduce effects of ambient light. A non-structured passive light embodiment is similar except the source of optical energy is ambient light. A subtraction technique preferably enhances the signal/noise ratio. The companion device may in fact house the present invention.

20 Claims, 11 Drawing Sheets

QUASI-THREE-DIMENSIONAL METHOD AND APPARATUS TO DETECT AND LOCALIZE INTERACTION OF USER-OBJECT AND VIRTUAL TRANSFER DEVICE

RELATION TO PREVIOUSLY FILED APPLICATION

Priority is claimed from applicants' U.S. provisional patent application serial No. 60/287,115 filed on Apr. 27, 2001, now abandoned, entitled "Input Methods Using Planar Range Sensors", from U.S. provisional patent application serial No. 60/272,120 filed on Feb. 27, 2001,nowabandoned, entitled "Vertical Triangulation System for a Virtual Touch-Sensitive Surface", and from U.S. provisional patent application serial No. 60/231,184 filed on Sep. 7, 2000,now abandoned, entitled "Application of Image Processing Techniques for a Virtual Keyboard System". Further, this application is a continuation-in-part from co-pending U.S. patent application Serial No. 09/502,499 filed on Feb. 11, 2000 entitled "Method And Apparatus for Entering Data Using A Virtual Input Device". Each of said applications is incorporated herein by reference.

FIELD OF THE INVENTION

The invention relates generally to sensing proximity of a stylus or user finger relative to a device to input or transfer commands and/or data to a system, and more particularly to such sensing relative to a virtual device used to input or transfer commands and/or data and/or other information to a system.

BACKGROUND OF THE INVENTION

It is often desirable to use virtual input devices to input commands and/or data and/or transfer other information to electronic systems, for example a computer system, a musical instrument, even telephones. For example, although computers can now be implemented in almost pocket-size, inputting data or commands on a mini-keyboard can be time consuming and error prone. While many cellular telephones can today handle e-mail communication, actually inputting messages using the small telephone touch pad can be difficult.

For example, a PDA has much of the functionality of a computer but suffers from a tiny or non-existent keyboard. If a system could be used to determine when a user's fingers or stylus contacted a virtual keyboard, and what fingers contacted what virtual keys thereon, the output of the system could perhaps be input to the PDA in lieu of keyboard information. (The terms "finger" or "fingers", and "stylus" are used interchangeably herein.) In this example a virtual keyboard might be a piece of paper, perhaps that unfolds to the size of a keyboard, with keys printed thereon, to guide the user's hands. It is understood that the virtual keyboard or other input device is simply a work surface and has no sensors or mechanical or electronic components. The paper and keys would not actually input information, but the interaction or interface between the user's fingers and portions of the paper, or if not paper, portions of a work surface, whereon keys would exist, could be used to input information to the PDA. A similar virtual device and system might be useful to input e-mail to a cellular telephone. A virtual piano-type keyboard might be used to play a real musical instrument. The challenge is how to detect or sense where the user's fingers or a stylus are relative to the virtual device.

U.S. Pat. No. 5,767,848 to Korth (1998) entitled "Method and Device For Optical Input of Commands or Data" attempts to implement virtual devices using a two-dimensional TV video camera. Such optical systems rely upon luminance data and require a stable source of ambient light, but unfortunately luminance data can confuse an imaging system. For example, a user's finger in the image foreground may be indistinguishable from regions of the background. Further, shadows and other image-blocking phenomena resulting from a user's hands obstructing the virtual device would seem to make implementing a Korth system somewhat imprecise in operation. Korth would also require examination of the contour of a user's fingers, finger position relative to the virtual device, and a determination of finger movement.

U.S. Pat. No. _____ to Bamji et al. (2001) entitled "CMOS-Compatible Three-Dimensional Image Sensor IC", application serial No. 09/406,059, filed Sep. 22, 1999, discloses a sophisticated three-dimensional imaging system usable with virtual devices to input commands and data to electronic systems. In that patent, various range finding systems were disclosed, which systems could be used to determine the interface between a user's fingertip and a virtual input device, e.g., a keyboard. Imaging was determined in three-dimensions using time-of-flight measurements. A light source emitted optical energy towards a target object, e.g., a virtual device, and energy reflected by portions of the object within the imaging path was detected by an array of photodiodes. Using various sophisticated techniques, the actual time-of-flight between emission of the optical energy and its detection by the photodiode array was determined. This measurement permitted calculating the vector distance to the point on the target object in three-dimensions, e.g., (x,y,z). The described system examined reflected emitted energy, and could function without ambient light. If for example the target object were a layout of a computer keyboard, perhaps a piece of paper with printed keys thereon, the system could determine which user finger touched what portion of the target, e.g., which virtual key, in what order. Of course the piece of paper would be optional and would be used to guide the user's fingers.

Three-dimensional data obtained with the Bamji invention could be software-processed to localize user fingers as they come in contact with a touch surface, e.g., a virtual input device. The software could identify finger contact with a location on the surface as a request to input a keyboard event to an application executed by an associated electronic device or system (e.g., a computer, PDA, cell phone, Kiosk device, point of sale device, etc.). While the Bamji system worked and could be used to input commands and/or data to a computer system using three-dimensional imaging to analyze the interface of a user's fingers and a virtual input device, a less complex and perhaps less sophisticated system is desirable. Like the Bamji system, such new system should be relatively inexpensive to mass produce and should consume relatively little operating power such that battery operation is feasible.

The present invention provides such a system.

SUMMARY OF THE PRESENT INVENTION

The present invention localizes interaction between a user finger or stylus and a passive touch surface (e.g., virtual input device), defined above a work surface, using planar quasi-three-dimensional sensing. Quasi-three-dimensional sensing implies that determination of an interaction point can be made essentially in three dimensions, using as a reference a two-dimensional surface that is arbitrarily oriented in three-dimensional space. Once a touch has been detected, the invention localizes the touch region to determine where on a virtual input device the touching occurred, and what data or command keystroke, corresponding to the localized region that was touched, is to be generated in response to the touch. Alternatively, the virtual input device might include a virtual mouse or trackball. In such an embodiment, the present invention would detect and report coordinates of the point of contact with the virtual input device, which coordinates would be coupled to an application, perhaps to move a cursor on a display (in a virtual mouse or trackball implementation) and/or to lay so-called digital ink for a drawing or writing application (virtual pen or stylus implementation). In the various embodiments, triangulation analysis methods preferably are used to determine where user-object "contact" with the virtual input device occurs.

In a so-called structured-light embodiment, the invention includes a first optical system (OS1) that generates a plane of optical energy defining a fan-beam of beam angle $\phi$ parallel to and a small stand-off distance $\Delta Y$ above the work surface whereon the virtual input device may be defined. In this embodiment, the plane of interest is the plane of light produced by OS1, typically a laser or LED light generator. The two parallel planes may typically be horizontal, but they may be disposed vertically or at any other angle that may be convenient. The invention further includes a second optical system (OS2) that is responsive to optical energy of the same wavelength as emitted by OS1. Preferably OS2 is disposed above OS1 and angled with offset $\theta$, relative to the fan-beam plane, toward the region where the virtual input device is defined. OS2 is responsive to energy emitted by OS1, but the wavelength of the optical energy need not be visible to humans.

The invention may also be implemented using non-structured-light configurations that may be active or passive. In a passive triangulation embodiment, OS1 is a camera rather than an active source of optical energy, and OS2 is a camera responsive to the same optical energy as OS1, and preferably disposed as described above. In such embodiment, the plane of interest is the projection plane of a scan line of the OS1 camera. In a non-structured-light embodiment such as an active triangulation embodiment, OS1 and OS2 are cameras and the invention further includes an active light source that emits optical energy having wavelengths to which OS1 and OS2 respond. Optionally in such embodiment, OS1 and OS2 can each include a shutter mechanism synchronized to output from the active light source, such that shutters in OS1 and OS2 are open when optical energy is emitted, and are otherwise closed. An advantage of a non-structured light configuration using two cameras is that bumps or irregularities in the work surface are better tolerated. The plane defined by OS1 may be selected by choosing an appropriate row of OS1 sensing pixel elements to conform to the highest y-dimension point (e.g., bump) of the work surface.

In the structured-light embodiment, OS2 will not detect optical energy until an object, e.g., a user finger or stylus, begins to touch the work surface region whereon the virtual input device is defined. However, as soon as the object penetrates the plane of optical energy emitted by OS1, the portion of the finger or stylus intersecting the plane will be illuminated (visibly or invisibly to a user). OS2 senses the intersection with the plane of interest by detecting optical energy reflected towards OS2 by the illuminated object region. Essentially only one plane is of interest to the present invention, as determined by configuration of OS1, and all other planes definable in three-dimensional space parallel to the virtual input device can be ignored as irrelevant. Thus, a planar three-dimensional sensor system senses user interactions with a virtual input device occurring on the emitted fan-beam plane, and ignores any interactions on other planes.

In this fashion, the present invention detects that an object has touched the virtual input device. Having sensed that a relevant touch-intersection is occurring, the invention then localizes in two-dimensions the location of the touch upon the plane of the virtual device. In the preferred implementation, localized events can include identifying which virtual keys on a virtual computer keyboard or musical keyboard are touched by the user. The user may touch more than one virtual key at a time, for example the "shift" key and another key. Note too that the time order of the touchings is determined by the present invention. Thus, if the user touches virtual keys for "shift" and "t", and then for the letters "h" and then "e", the present invention will recognize what is being input as "T" then "h" and then "e", or "The". It will be appreciated that the present invention does not rely upon ambient light, and thus can be fully operative even absent ambient light, assuming that the user knows the location of the virtual input device.

Structured-light and/or non-structured light passive triangulation methods may be used to determine a point of contact (x,z) between a user's hand and the sense plane. Since the baseline distance B between OS1 and OS2 is known, a triangle is formed between OS1, OS2 and point (x,z), whose sides are B, and projection rays R1 and R2 from OS1, OS2 to (x,z). OS1 and OS2 allow determination of triangle angular distance from a reference plane, as well as angles $\alpha_1$ and $\alpha_2$ formed by the projection rays, and trigonometry yields distance z to the surface point (x,z), as well as projection ray lengths.

A processor unit associated with the present invention executes software to identify each intersection of a user-controlled object with the virtual input device and determines therefrom the appropriate user-intended input data and/or command, preferably using triangulation analysis. The data and/or commands can then be output by the present invention as input to a device or system for which the virtual input device is used. If desired the present invention may be implemented within the companion device or system, especially for PDAs, cellular telephones, and other small form factor device or systems that often lack a large user input device such as a keyboard.

Other features and advantages of the invention will appear from the following description in which the preferred embodiments have been set forth in detail, in conjunction with their accompanying drawings.

DETAILED DESCRIPTION OF THE PREFERRED EMBODIMENT

Figure 1A:
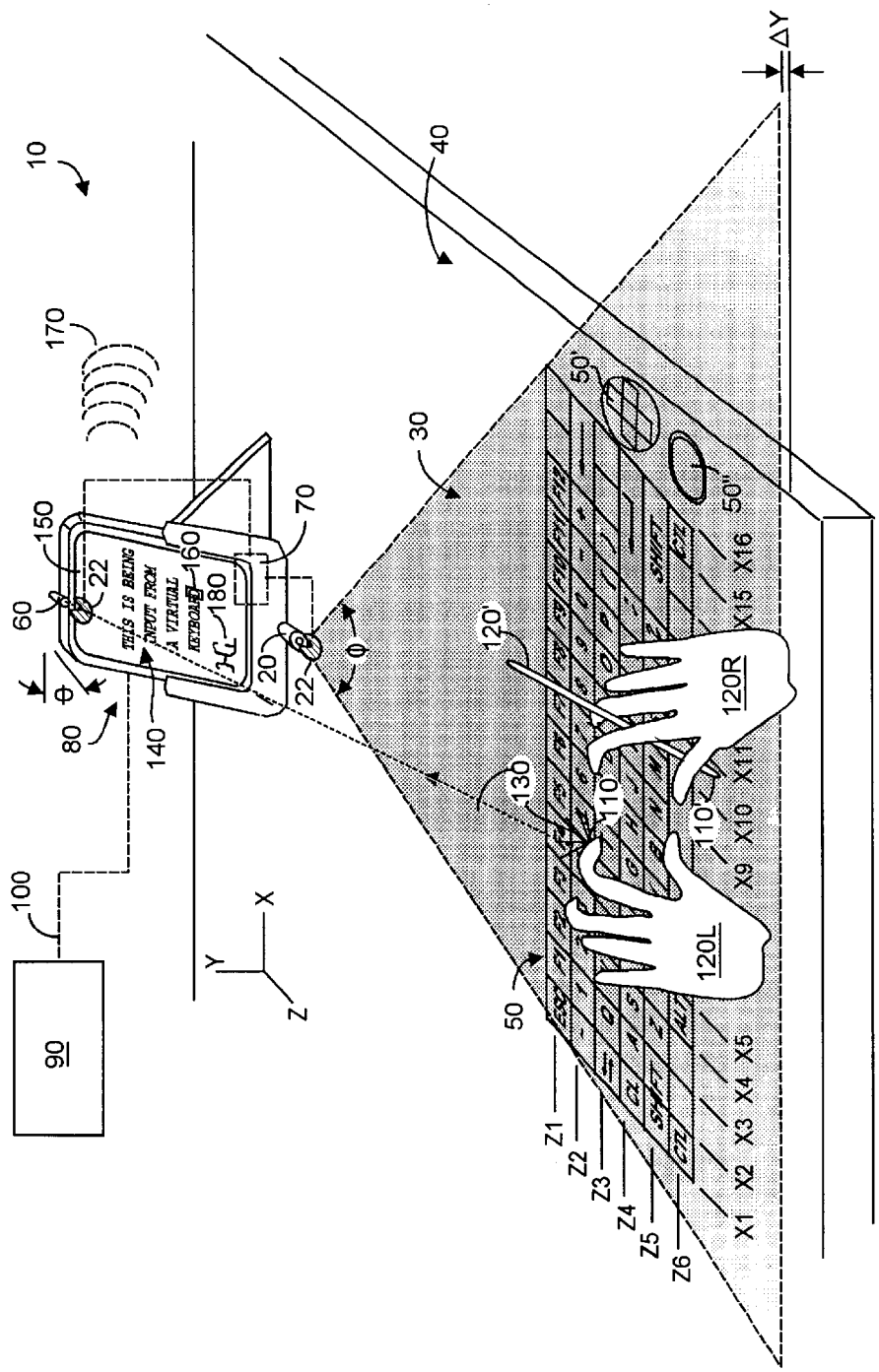
FIG. 1A depicts a planar quasi-three-dimensional detection structured-light system used to detect user input to a virtual input device, according to the present invention.

FIG. 1A depicts a preferred embodiment of a quasi-planar three-dimensional sensing system 10 comprising, in a structured-light system embodiment, a first optical system (OS1) 20 that emits a fan-beam plane 30 of optical energy parallel to a planar work surface 40 upon which there is defined a virtual input device 50 and/or 50' and/or 50". Preferably the fan-beam defines a fan angle φ, and is spaced-apart from the work surface by a small stand-off distance ΔY. Any object (e.g., a user finger or stylus) attempting to touch the work surface must first contact the fan-beam and will thereby be illuminated (visibly or not visibly) with emitted optical energy. While fan-beam plane 30 and the work surface plane 40 are shown horizontally disposed in FIG. 1A, these two planes may be disposed vertically or indeed at any other angle that may be desired for a system. Note that, without limitation, work surface 40 could be a portion of a work desk, a table top, a portion of a vehicle, e.g., a tray in an airplane, a windshield or dashboard, a wall, a display including a projected image, or a display such as a CRT, an LCD, etc. As used herein, the term "plane" will be understood to include a subset of a full plane. For example, fan-beam plane 30 will be termed a plane, even though it has finite width and does not extend infinitely in all directions.

By "virtual input device" it is meant that an image of an input device may be present on work surface 40, perhaps by placing a paper bearing a printed image, or perhaps system 10 projects a visible image of the input device onto the work surface, or there literally may be no image whatsoever visible upon work surface 40. As such, virtual input device 50, 50', 50" requires no mechanical parts such as working keys, and need not be sensitive to a touch by a finger or stylus; in short, the virtual input device preferably is passive.

In the example of FIG. 1A, virtual input device 50 is a computer-type keyboard that may be full sized or scaled up or down from an actual sized keyboard. If desired the virtual input device may comprise or include a virtual trackball 50' and/or a virtual touchpad 50". When system 10 is used with a virtual keyboard input device 50, or virtual trackball 50' or virtual touchpad 50", a fan angle φ of about 50° to 90° and preferably about 90° will ensure that fan beam 30 encompasses the entire virtual input device at distances commonly used. Further, for such a virtual input device, a stand-off distance ΔY of up to a few mm works well, preferably about 1 mm.

System 10 further includes a second optical system (OS2) 60, typically a camera with a planar sensor, that is preferably spaced apart from and above OS1 20, and inclined toward work surface 40 and plane 30 at an angle θ, about 10° to about 90°, and preferably about 25°. System 10 further includes an electronic processing system 70 that, among other tasks, supervises OS1 and OS2. System 70 preferably includes at least a central processor unit (CPU) and associated memory that can include read-only-memory (ROM) and random access memory (RAM).

In FIG. 1A, system 10 elements OS1 20, OS2 60, and processor unit 70 are shown disposed on or in a device 80. Device 80 may be a stand-alone implementation of system 10 or may in fact be a system or device for which virtual input device 50 is used to input data or commands. In the latter case, device 80 may, without limitation, be a computer, a PDA (as shown in FIG. 1A), a cellular telephone, a musical instrument, etc. If system or device 80 is not being controlled by the virtual input device, the device 90 being so controlled can be coupled electrically to system/device 80 to receive data and/or commands input from virtual device 50. Where the virtual device is a trackball (or mouse) 50' or touchpad 50", user interaction with such virtual device can directly output raw information or data comprising touch coordinates (x,z) for use by device 80. For example, user interaction with virtual input device 50' or 50" might reposition a cursor 160 on a display 140, or otherwise alter an application executed by device 80, or lay down a locus of so-called digital ink 180 that follows what a user might "write" using a virtual mouse or trackball 50', or using a stylus 120' and a virtual touchpad 50". System/device 90 can be electrically coupled to system 80 by a medium 100 that may without limitation include wire(s) or be wireless, or can be a network including the internet.

In a structured-light embodiment, OS1 20 emits optical energy in fan-beam 30, parallel to the x-z plane 30. OS1 may include a laser line generator or an LED line generator, although other optical energy sources could be used to emit plane 30. A line generator OS1 is so called because it emits a plane of light that when intersected by a second plane illuminates what OS2 would view as a line on the second plane. For example if a cylindrical object intersected plane 30, OS2 would see the event as an illuminated portion of an elliptical arc whose aspect ratio would depend upon distance of OS2 above plane 30 and surface 40. Thus, excluding ambient light, detection by OS2 of an elliptical arc on plane 30 denotes a touching event, e.g., that an object such as 120R has contacted or penetrated plane 30. Although a variety of optical emitters may be used, a laser diode outputting perhaps 3 mW average power at a wavelength of between 300 nm to perhaps 1,000 nm could be used. While ambient light wavelengths (e.g., perhaps 350 nm to 700 nm) could be used, the effects of ambient light may be minimized without filtering or shutters if such wavelengths are avoided. Thus, wavelengths of about 600 nm (visible red) up to perhaps 1,000 nm (deep infrared) could be used. A laser diode outputting 850 nm wavelength optical energy would represent an economical emitter, although OS2 would preferably include a filter to reduce the effects of ambient light.

While OS1 preferably is stationary in a structured light embodiment, it is understood that a fan-beam 30 could be generated by mechanically sweeping a single emitted line of optical energy to define the fan-beam plane 30. As shown in FIG. 2B, OS1 may in fact include an optical energy emitter 20-A that emits a fan beam, and a reflecting mirror 20-B that directs the fan beam 30 substantially parallel to surface 40. For purposes of the present invention, in a structured light embodiment, optical energy emitted by OS1 20 may be visible to humans or not visible. OS2 60 preferably includes a camera system responsive to optical energy of the wavelength emitted by OS1 20. By "responsive" it is meant that OS2 recognizes energy of the same wavelength emitted by OS1, and ideally will not recognize or respond to energy of substantially differing wavelength. For example, OS2 may include a filter system such that optical energy of wavelength other than that emitted by OS1 is not detected, for example a color filter.

If desired, OS2 could be made responsive substantially solely to optical energy emitted from OS1 by synchronously switching OS1 and OS2 on and off at the same time, e.g., under control of unit 70. OS1 and OS2 preferably would include shutter mechanisms, depicted as elements 22, that would functionally open and close in synchronized fashion. For example, electronic processing system 70 could synchronously switch-on OS1, OS2, or shutter mechanisms 22 for a time period $t_1$ with a desired duty cycle, where $t_1$ is perhaps in the range of about 0.1 ms to about 35 ms, and then switch-off OS1 and OS2. If desired, OS1 could be operated at all times, where plane 30 is permitted to radiate only when shutter 22 in front of OS1 20 is open. In the various shutter configuration, repetition rate of the synchronous switching is preferably in the range of 20 Hz to perhaps 300 Hz to promote an adequate rate of frame data acquisition. To conserve operating power and reduce computational overhead, a repetition rate of perhaps 30 Hz to 100 Hz represents an acceptable rate. Of course other devices and methods for ensuring that OS2 responds substantially only to optical energy emitted by OS1 may also be used. For ease of illustration shutters 22 are depicted as mechanical elements, but in practice the concept of shutters 22 is understood to include turning on and off light sources and cameras in any of a variety of ways.

If desired, source(s) of optical energy used with the present invention could be made to carry a so-called signature to better enable such energy to be discerned from ambient light energy. For example and without limitation, such sources might be modulated at a fixed frequency such that cameras or other sensor units used with the present invention can more readily recognize such energy while ambient light energy would, by virtue of lacking such signature, be substantially rejected. In short, signature techniques such as selecting wavelengths for optical energy that differ from ambient light, techniques that involve synchronized operation of light sources and camera sensors, and modulating or otherwise tagging light source energy can all improve the signal/noise ratio of information acquired by the present invention.

Note that there is no requirement that work surface 40 be reflective or non-reflective with respect to the wavelength emitted by OS1 since the fan-beam or other emission of optical energy does not reach the surface per se. Note too that preferably the virtual input device is entirely passive. Since device 50 is passive, it can be scaled to be smaller than a full-sized device, if necessary. Further, the cost of a passive virtual input device can be nil, especially if the "device" is simply a piece of paper bearing a printed graphic image of an actual input device.

In FIG. 1A, assume initially that the user of system 10 is not in close proximity to virtual input device 50. In a structured-light embodiment, although OS1 may emit optical energy fan-beam plane 30, OS2 detects nothing because no object intersects plane 30. Assume now that a portion 110 of a finger of a user's left or right hand 120L, 120R moves downward to touch a portion of the area of work surface 40 whereon the virtual input device 50 is defined. Alternatively, portion 110' of a user-controlled stylus 120' could be moved downward to touch a relevant portion of work surface 40. Within the context of the present invention, a touch is interpreted by software associated with the invention as a request to send a keyboard event to an application running on a companion device or system 80 or 90, e.g., notebook, PDA, cell phone, Kiosk device, point of sale device, etc.

In FIG. 1A, as the user's finger moves downward and begins to intersect optical energy plane 30, a portion of the finger tip facing OS1 will now reflect optical energy 130. At least some reflected optical energy 130 will be detected by OS2, since the wavelength of the reflected energy is the same as the energy emitted by OS1, and OS2 is responsive to energy of such wavelength. Thus, planar quasi-three-dimensional sense system 10 detects optical energy reflected by the interaction of a user controlled object (e.g., a finger, a stylus, etc.) occurring at a plane of interest defined by fan-beam plane 30. Any interaction(s) that may occur on any other plane are deemed not relevant and may be ignored by the present invention.

Thus, until an object such as a portion of a user's hand or perhaps of a stylus intersects the optical energy plane 30 emitted by OS1 20, there will be no reflected optical energy 130 for OS2 60 to detect. Under such conditions, system 10 knows that no user input is being made. However as soon as the optical energy plane is penetrated, the intersection of the penetrating object (e.g., fingertip, stylus tip, etc.) is detected by OS2 60, and the location (x,z) of the penetration can be determined by processor unit 70 associated with system 10. In FIG. 1A, if the user's left forefinger is touching the portion of virtual input device 50 defined as co-ordinate (x7,z3), then software associated with the invention can determine that the letter "t" has been "pressed". Since no "shift key" is also being pressed, the pressed letter would be understood to be lower case "t".

In the embodiment shown, system 10 can generate and input to system 80 or 90 keystrokes representing data and/or commands that a user would have entered on an actual keyboard. Such input to system 80 or 90 can be used to show information 140 on display 150, as the information is entered by the user on virtual input device 50. If desired, an enlarged cursor region 160 could be implemented to provide additional visual input to aid the user who is inputting information. If desired, processor unit 70 could cause system 80 and/or 90 to emit audible feedback to help the user, e.g., electronic keyclick sounds 170 corresponding with the "pressing" of a virtual key on virtual input device 50. It is understood that if system 80 or 90 were a musical instrument rather than a computer or PDA or cellular telephone, musical sounds 170 would be emitted, and virtual input device 50 could instead have the configuration similar to a piano keyboard or keyboards associated with synthetic music generators.

Figure 1B:
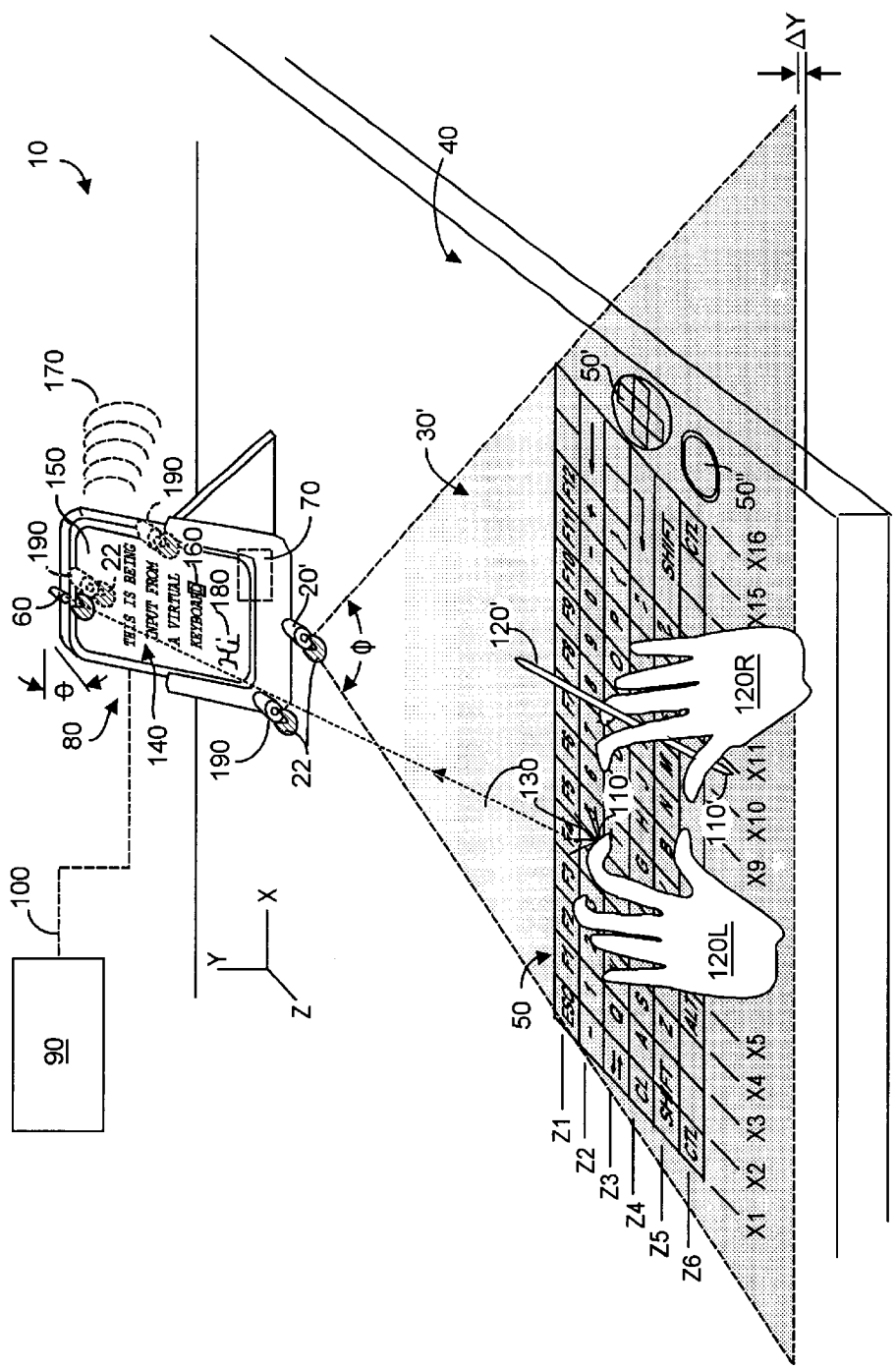
FIG. 1B depicts a planar quasi-three-dimensional detection non-structured active light system used to detect user input to a virtual input device, according to the present invention.

FIG. 1B depicts a non-structured active light system 10, in which a camera 20' in a first optical system OS1 defines a plane of interest 30' that in essence replaces plane 30 defined by optical emitter OS1 in the embodiment of FIG. 1A. Camera 20' OS1 preferably is similar to camera 60 OS2, which may be similar to camera 60 OS2 in the embodiment of FIG. 1A. For example, OS1 20' may have a sensor array that comprises at least one line and preferably several lines of pixel detector elements. The embodiment of FIG. 1B is active in that one or more light sources 190, disposed intermediate OS1 20' and OS2 60 generate optical energy of a wavelength that is detectable by camera OS1 20' and by camera OS2 60. To reduce the effects of ambient light upon detection by cameras OS1 and OS2, preferably each camera and each optical energy emitter 190 operates in cooperation with a shutter mechanism, preferably synchronized, e.g., by unit 70. Thus, during the times that shutters 22 permit optical energy from emitter 190 to radiate towards the virtual input device 50, 50', 50", similar shutters 22 will permit cameras OS1 and OS2 to detect optical energy. The interaction of user-object, e.g., 120L with plane 30' is detected by OS1 and by OS2. The location of the point of intersection is then calculated, e.g., using triangulation methods described later herein.

In FIG. 1B, a bump or irregularity in the plane of work surface 40 is shown near the point of contact 110 with the user-object 120L. An advantage of the presence of second camera OS1 20' is that the plane of interest 30' may be selected, perhaps by unit 70, to lie just above the highest irregular portion of work surface 40. If irregularities were present in work surface 40 in the embodiment of FIG. 1A, it would be necessary to somehow reposition the laser plane 30 relative to the work surface. But in FIG. 1B, the effect of such repositioning is attained electronically simply by selecting an appropriate line of pixels from the detector array with OS1 20'.

Note that the configuration of FIG. 1B lends itself to various methods to improve the signal/noise ratio. For example, shutters 22 can permit cameras OC1 and OS2 to gather image data during a time that emitters 190 are turned off, e.g., by control unit 70. Any image data then acquired by OS1 and/or OS2 will represent background noise resulting from ambient light. (Again it is understood that to minimize effects of ambient light, emitters 190 and cameras OS1, OS2 preferably operate at a wavelength regime removed from that of ambient light.) Having acquired what might be termed a background noise signal, cameras OS1 and OS2 can now be operated normally and in synchronism with emitter(s) 190. Image data acquired by cameras OS1 and OS2 in synchronism with emitter(s) 190 will include actual data, e.g., user-object interface with plane 30', plus any (undesired) effects due to ambient light. Processor unit 70 (or another unit) can then dynamically subtract the background noise signal from the actual data plus noise signal, to arrive at an actual data signal, thus enhancing the signal/noise ratio.

Figure 1C:
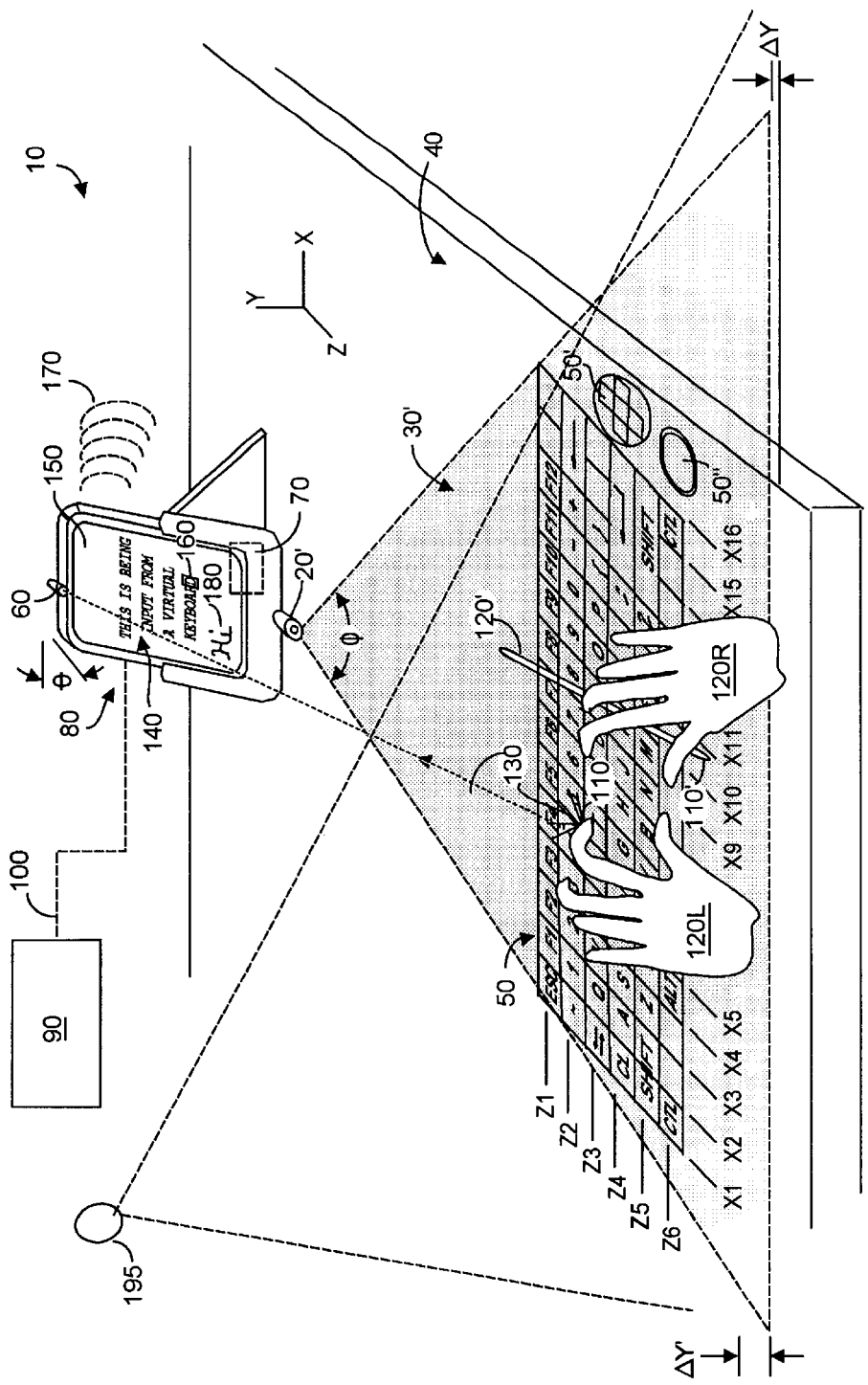
FIG. 1C depicts a planar quasi-three-dimensional detection non-structured passive light system used to detect user input to a virtual input device, according to the present invention.

FIG. 1C depicts a non-structured passive embodiment of the present invention. System 10 in FIG. 1C is passive in that whatever source 195 of ambient light is present provides optical energy used during imaging. Similar to system 10 in FIG. 1B, OS1 is a camera 20' that defines a plane of interest 30', and OS2 is a camera 60. Typically plane 30' will be defined a distance $\Delta Y'$ above work surface 40, typically a distance of a few mm. User-object interaction with plane 30' is detected by OS1 and OS2, using optical energy from ambient light source 195. Triangulation methods may then be used to localize the point of interaction or intersection with plane 30', as described elsewhere herein.

Figure 2A:
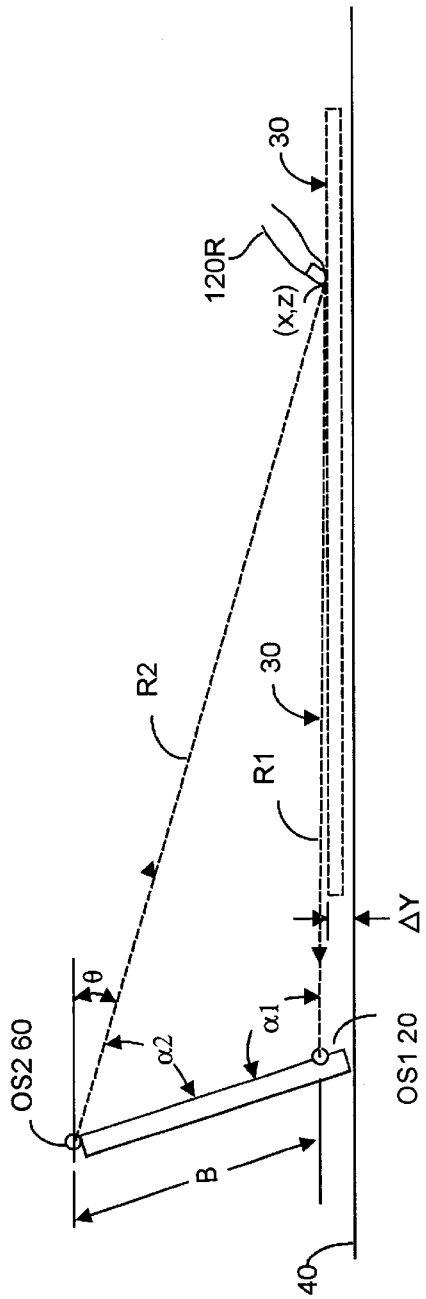
FIG. 2A depicts geometry associated with location determination using triangulation, according to the present invention.
Figure 2B:
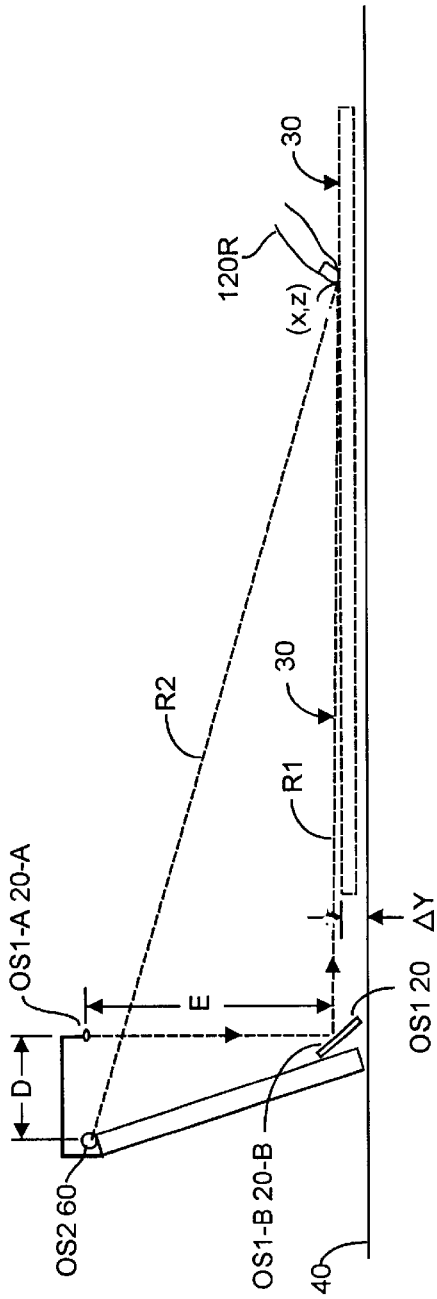
FIG. 2B depicts use of a spaced-apart optical emitter and reflector as a first optical system, according to the present invention.

FIG. 2A depicts the geometry with which location (x,z) of the intercept point between a user's finger or object 120R and plane 30 may be determined using triangulation. FIG. 2A and FIG. 2B may be used to describe analysis of the various embodiments shown in FIGS. 1A–1C.

As used herein, triangulation helps determine the shape of surfaces in a field of view of interest by geometric analysis of triangles formed by the projection rays, e.g., R1, R2 of two optical systems, e.g., OS1 20, OS2 60. A baseline B represents the known length of the line that connects the centers of projection of the two optical systems, OS1, OS2. For a point (x,z) on a visible surface in the field of view of interest, a triangle may be defined by the location of the point and by locations of OS1, and OS2. The three sides of the triangle are B, R1, and R2. OS1 and OS2 can determine the angular distance of the triangle from a reference plane, as well as the angles $\alpha_1$ and $\alpha_2$ formed by the projection rays that connect the surface point with the centers of projection of the two optical systems. Angles $\alpha_1$ and $\alpha_2$ and baseline B completely determine the shape of the triangle. Simple trigonometry can be used to yield the distance to the surface point (x,z), as well as length of projection ray R1 and/or R2.

It is not required that OS1 20 be implemented as a single unit. For example FIG. 2B depicts a structured-light embodiment in which the first optical system is bifurcate: one portion OS1-A 20-A is a light emitter disposed distance B from OS2 and from the second portion OS1-B 20-B, a light reflecting device such as a mirror. An incoming fan beam generated by OS1-A is deflected by mirror 20-B to form the plane 30. In the orientation of FIG. 2B, mirror 20-B is inclined about 45° relative to the horizontal plane, and deflection is from a substantially vertical plane to a substantial horizontal plane. In FIG. 2B and indeed in a passive light embodiment, OS2 60 will be a camera aimed at angle $\phi$ generally toward the field of view of interest, namely where a user's finger or stylus will be to "use" a virtual input device disposed beneath fan plane 30.

Triangulation according to the present invention preferably uses a standard camera with a planar sensor as OS2 60. The nature of OS1 20 distinguishes between two rather broad classes of triangulation. In a structured-light triangulation, OS1 20 is typically a laser or the like whose beam may be shaped as a single line that is moved to project a moving point onto a surface. Alternatively the laser beam may be planar and moved to project a planar curve. As noted, another class of triangulation system may be termed passive triangulation in which a camera is used as OS1 20. Structured-light systems tend to be more complex to build and consume more operating power, due to the need to project a plane of light. Passive systems are less expensive, and consume less power. However passive system must solve the so-called correspondence problem, e.g., to determine which pairs of points in the two images are projections of the same point in the real world. As will be described, passive non-structured-light triangulation embodiments may be used, according to the present invention.

Whether system 10 is implemented as a structured-light system in which OS1 actively emits light and OS2 is a camera, or as a passive system in which OS1 and OS2 are both cameras, information from OS2 and OS1 will be coupled to a processing unit, e.g., 70, that can determine what events are occurring. In either embodiment, when an object such as 120R intersects the projection plane 30 associated with OS1 20, the intersection is detectable. In a structured-light embodiment in which OS1 emits optical energy, the intersection is noted by optical energy reflected from the intersected object 120R and detected by OS2, typically a camera. In a passive light embodiment, the intersection is seen by OS1, a camera, and also by OS2, a camera. In each embodiment, the intersection with plane 30 is detected as though the region of surface 40 underlying the (x,z) plane intersection were touched by object 120R. System 10 preferably includes a computing system 70 that receives data from OS1, OS2 and uses geometry to determine the plane intersection position (x,z) from reflected image coordinates in a structured-light embodiment, or from camera image coordinates in a passive system. As such, the dual tasks of detecting initial and continuing contact and penetration of plane 30 (e.g., touch events), and determining intersection coordinate positions on the plane may be thus accomplished.

To summarize thus far, touch events are detected and declared when OS1 recognizes the intersection of plane 30 with an intruding object such as 120R. In a two-camera system, a correspondence is established between points in the perceived image from OS1 and from those in OS2. Thereafter, OS2 camera coordinates are transformed into touch-area (x-axis, z-axis) coordinates to locate the (x,z) coordinate position of the event within the area of interest in plane 30. Preferably such transformations are carried out by processor unit 70, which executes algorithms to compute intersect positions in plane 30 from image coordinates of points visible to OS2. Further, a passive light system must distinguish intruding objects from background in images from OS1 and OS2. Where system 10 is a passive light system, correspondence needs to be established between the images from camera OS1 and from camera OS2. Where system 10 is a structured-light system, it is desired to minimize interference from ambient light.

Consider now computation of the (X,Z) intersection or tip position on plane 30. In perspective projection, a plane in the world and its image are related by a transformation called a homography. Let a point (XZ) on such plane be represented by the column vector $P=(X, Z, 1)^T$, where the superscript T denotes transposition. Similarly, let the corresponding image point be represented by $p=(x, z, 1)^T$.

A homography then is a linear transformation P=Hp, where H is a 3×3 matrix.

This homography matrix may be found using a calibration procedure. Since the sensor rests on the surface, sensor position relative to the surface is constant, and the calibration procedure need be executed only once. For calibration, a grid of known pitch is placed on the flat surface on which the sensor is resting. The coordinates $p_i$ of the image points corresponding to the grid vertices $P_i$ are measured in the image. A direct linear transform (DLT) algorithm can be used to determine the homography matrix H. Such DLT transform is known in the art; see for example Richard Hartley and Andrew Zisserman. *Multiple View Geometry in Computer Vision*, Cambridge University Press, Cambridge, UK, 2000.

Once H is known, the surface point P corresponding to a point p in the image is immediately computed by the matrix-vector multiplication above. Preferably such computations are executed by system 70.

Image correspondence for passive light embodiments will now be described. Cameras OS1 20 and OS2 60 see the same plane in space. As a consequence, mapping between the line-scan camera image from OS1 and the camera image from OS2 will itself be a homography. This is similar to mapping between the OS2 camera image and the plane 30 touch surface described above with respect to computation of the tip intercept position. Thus a similar procedure can be used to compute this mapping.

Note that since line scan camera OS1 20 essentially sees or grazes the touch surface collapsed to a single line, homography between the two images is degenerate. For each OS2 camera point there is one OS1 line-scan image point, but for each OS1 line-scan image point there is an entire line of OS2 camera points. Because of this degeneracy, the above-described DLT algorithm will be (trivially) modified to yield a point-to-line correspondence.

By definition, a passive light embodiment of the present invention has no control over ambient lighting, and it can be challenging to distinguish intruding intersecting objects or tips from the general background. In short, how to tell whether a particular image pixel in an OS1 image or OS2 image represents the image of a point on an object such as 120R, or is a point in the general background. An algorithm executable by system 70 will now be described.

Initially, assume one or more background images $I_1, \ldots, I_n$ with only the touch surface portion of plane 30 in view. Assume that cameras OS1 and OS2 can respond to color, and let $R_{bi}(x,z)$, $G_{bi}(x,z)$, $B_{bi}(x,z)$ be the red, green, and blue components of the background image intensity $I_i$ at pixel position (x,z). Let $S_b(x,z)$ be a summary of $R_{bi}(x,z)$, $G_{bi}(x,z)$, $B_{bi}(x,z)$ over all images. For instance, $S_b(x,z)$ can be a three-vector with the averages, medians, or other statistics of $R_{bi}(x,z)$, $G_{bi}(x,z)$, $B_{bi}(x,z)$ at pixel position (x, z) over all background images $I_1, \ldots I_n$, possibly normalized to de-emphasize variations in image brightness.

Next, collect a similar summary $s_t$ for tip pixels over a new sequence of images $J_1, \ldots, J_m$. This second summary is a single vector, rather than an image of vectors as for $s_b(x,z)$. In other words, $s_t$ does not depend on the pixel position (x,z). This new summary can be computed, for instance, by asking a user to place finger tips or stylus in the sensitive area of the surface, and recording values only at pixel positions (x,z) whose color is very different from the background summary $S_b(x,z)$ at (x,z), and computing statistics over all values of j,x,z.

Then, given a new image with color components c(x,z)= (R(x,z), G(x,z), B(x,z)), a particular pixel at (x,z) is attributed to either tip or background by a suitable discrimination rule. For instance, a distance $d(c_1, c2)$ can be defined between three-vectors (Euclidean distance is one example), and pixels are assigned based on the following exemplary rule:

Background if $d(c(x, z), s_b(x, z)) \ll d(c(x, z), s_t)$.

Tip if $d(c(x, z), s_b(x, z)) \gg d(c(x, z), s_t)$.

Unknown otherwise.

Techniques for reducing ambient light interference, especially for a structured-light triangulation embodiment will now be described. In such embodiment, OS2 needs to distinguish between ambient light and light produced by the line generator and reflected back by an intruding object.

Using a first method, OS1 emits energy in a region of the light spectrum where ambient light has little power, for instance, in the near infrared. An infrared filter on camera OS2 can ensure that the light detected by the OS2 sensor is primarily reflected from the object (e.g., 120R) into the lens of camera OS2.

In a second method, OS1 operates in the visible part of the spectrum, but is substantially brighter than ambient light. Although this can be achieved in principle with any color of the light source, for indoor applications it may be useful to use a blue-green light source for OS1 (500 nm to 550 nm) because standard fluorescent lights have relatively low emission in this band. Preferably OS2 will including a matched filter to ensure that response to other wavelengths are substantially attenuated.

A third method to reduce effects of ambient light uses a standard visible laser source for OS1, and a color camera sensor for OS2. This method uses the same background subtraction algorithm described above. Let the following combination be defined, using the same terminology as above:

$$C(x,z)=\min\{d(c(x,z),\ s_b(x,z)),\ d(c(x,z),\ s_t)\}.$$

This combination will be exactly zero when c(x,z) is equal to the representative object tip summary $s_t$ (since $d(s_t, s_t)=0$) and for the background image $s_b(x,z)$ (since $d(s_b(x,z), s_b(x,z))=0$), and close to zero for other object tip image patches and for visible parts of the background. In other words, object tips and background will be hardly visible in the image C(x,z). By comparison, at positions where the projection plane 30 from laser emitter OS1 intersects object tips 120R, the term $d(c(x,z), s_t)$ will be significantly non-zero, which in turn yields a substantially non-zero value for C(x,z). This methodology achieves the desired goal of identifying essentially only the object tip pixels illuminated by laser (or other emitter) OS1. This method can be varied to use light emitters of different colors, to use other distance definitions for the distance d, and to use different summaries $s_b(x,z)$ and $s_t$.

In FIG. 1A, if device 80 is a compact system such as a PDA or cell telephone, it becomes especially desirable to reduce the size needed to implement the present invention. A smaller overall form fact can result if OS2 is inclined at some angle θ, as shown in FIGS. 1A–1C, 2A, 2B, with respect to plane 30 or surface 40. But as angle θ decreases, camera OS2 sees plane 30 from a shallower angle. For a fixed size for the sensitive area of plane 30, i.e., the surface rectangle that is to be "touched" by a user object to manipulate an underlying virtual input device, as distance B and angle θ decrease, the effective area subtended by the field of view decreases. The result is to decrease effective OS2 resolution and thus to decrease accuracy of z-depth measurements as shown in FIG. 3A, where L denotes a camera lens associated with OS2, whose plane of pixel detectors is shown as a straight line labeled OS2.

Figure 3A:
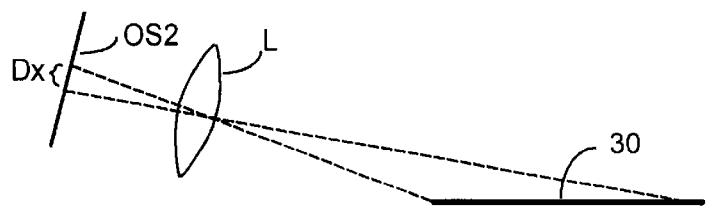
FIGS. 3A–3E depict design tradeoffs associated with varying orientations of OS2 sensor, OS2 lens, and detection plane upon effective field of view and image quality, according to the present invention.
Figure 3B:
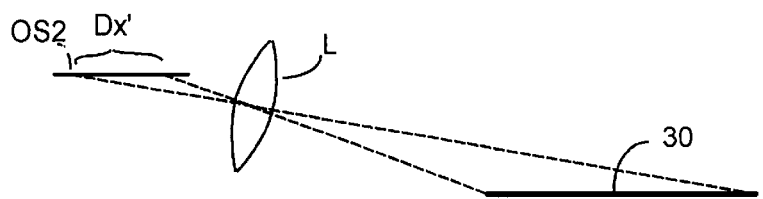

As noted in FIG. 3A, moving OS2 closer to plane 30 results in a shallower viewpoint and in a smaller, less accurately perceived, camera image. These adverse side effects may be diminished as shown in FIG. 3B by tilting the plane of pixel detectors in camera OS2, indeed tilting almost parallel to plane 30. With the tilted configuration of FIG. 3B, note that a substantially greater number of image scan lines intersect the cone of rays from the sensitive area on plane 30, which increases depth resolution accordingly. Compare, for example, the relatively small distance Dx in FIG. 3A with the larger distance Dx' in FIG. 3B, representing the larger number of image scan lines now in use. Further, as the OS2 camera sensor plane becomes more parallel to the plane of the touch surface or to plane 30, less distortion of the touch surface image results. This implies that parallel lines on the touch surface (or on plane 30) will remain parallel in the OS2 camera image. An advantage is the simplification of the homography H to an affine transformation (a shift and a scale). Further, image resolution is rendered more uniform over the entire sensitive area within the field of view of interest.

Figure 3C:
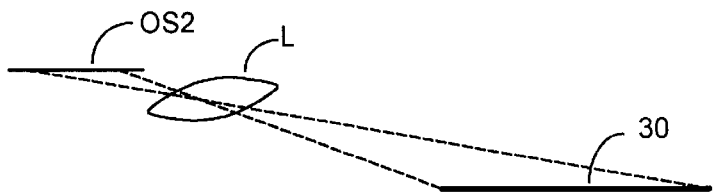

Consider now the configuration of FIG. 3C. It is apparent that different points on the touch sensitive area of interest on plane 30 are at different distances from lens L of camera OS2. This means that one cannot focus the entire sensitive area of interest precisely if lens L is positioned as shown in FIG. 3A or in FIG. 3B. While closing the camera iris could increase the depth of field, resultant images would become dimmer, and image signal-to-noise ratio would be degraded.

Figure 3D:
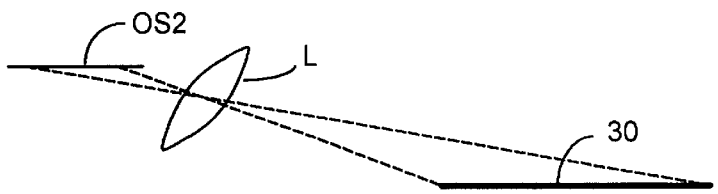

Accordingly the configuration of FIG. 3C may be employed in which lens L is repositioned relative to FIG. 3B. In this configuration, touch surface 30, the camera OS2 sensor, and camera lens L are said to satisfy the so-called Scheimpflug condition, in which their respective planes intersect along a common line, a line that is at infinity in FIG. 3C. Further details as to the Scheimpflug condition may be found at The Optical Society of America. *Handbook of Optics*, Michael Bass, Editor in Chief, McGraw-Hill, Inc.,1995. In FIG. 3C, when the relevant optical system satisfies this condition, all points on touch surface 30 will be in focus. Thus, by using an appropriately tilted sensor OS2, an appropriately positioned lens S that satisfy the Scheimpflug condition, the image seen by OS2 of points of interest on surface plane 30 will be in focus, and will exhibit high resolution with little distortion. But meeting the Scheimpflug condition can result in loss of image brightness because the angle that the lens subtends when viewed from the center of the sensitive area on plane 30 is reduced with respect to the configuration of FIG. 3B. As a consequence, it may be preferable in some applications to reach a compromise between sharpness of focus and image brightness, by placing OS2 camera lens in an orientation intermediate between those of FIG. 3B and FIG. 3C. FIG. 3D depicts one such intermediate configuration, in which lens L is purposely tilted slightly away from a Scheimpflug-satisfying orientation with respect to planes of OS2 and 30.

Figure 3E:
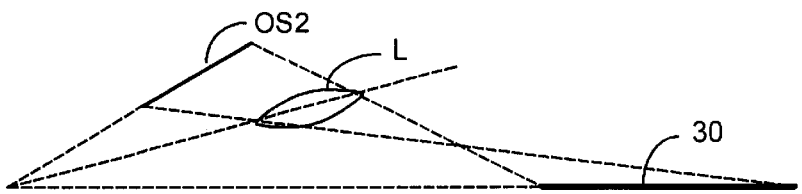

Such intermediate orientations do not satisfy the Scheimpflug condition, but by a lesser degree and therefore still exhibit good focusing than a configuration whose lens axis points directly towards the center of the sensitive area of plane 3. FIG. 3E depicts another alternative intermediate configuration, one in which the Scheimpflug condition is exactly verified, but the camera sensor OS2 is tilted away from horizontal. The configuration of FIG. 3E can achieve exact focus but with somewhat lower image resolution and more distortion than the configuration of FIG. 3C.

Figure 4:
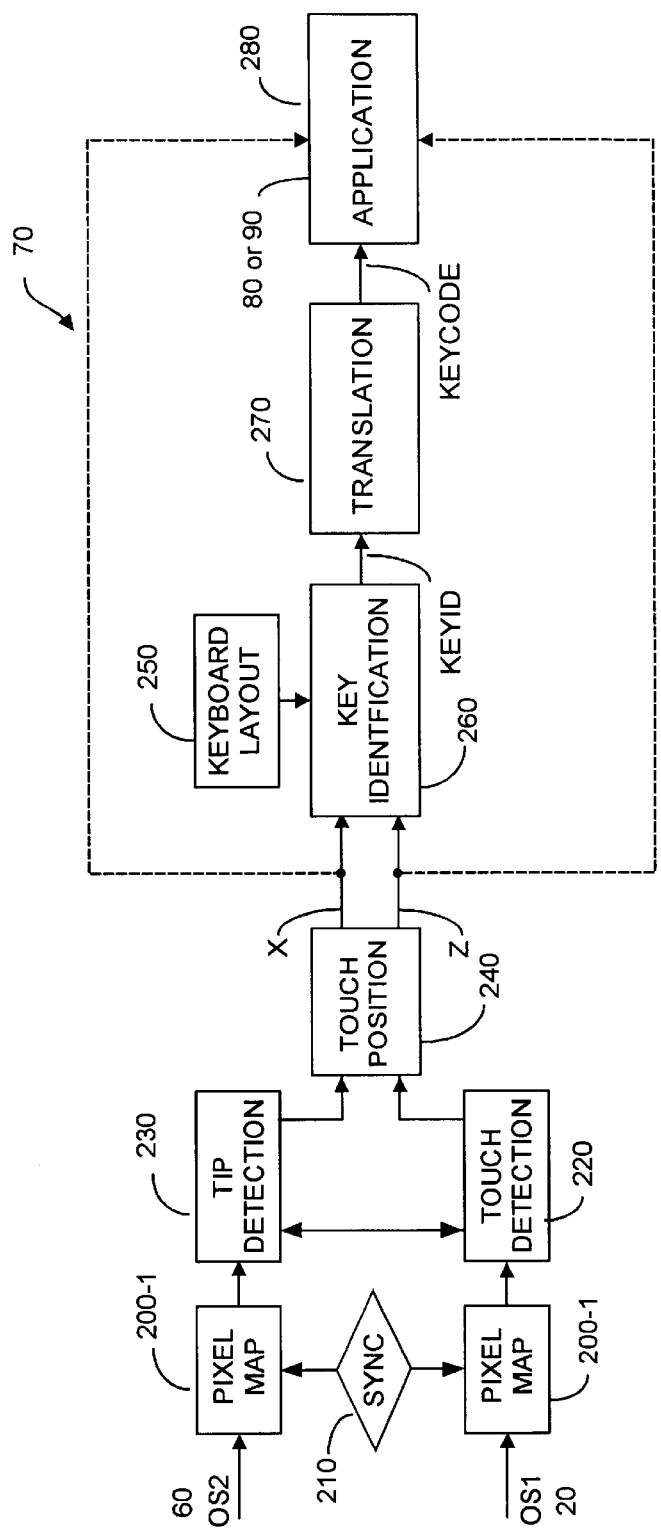
FIG. 4 is a block diagram depicting functions carried out by a processor unit in the exemplary system of FIG. 1B, according to an embodiment of the present invention.

FIG. 4 is a block diagram depicting operative portions of processor unit 70 within system 10, which processor unit preferably carries out the various triangulation and other calculations described herein to sense and identify (x,z) intercepts with the plane of interest 30. As the left portion of FIG. 4, information from OS1 20 and OS2 30 is input respectively to pixel maps 200-1, 200-2. In FIG. 4, OS1 and OS2 inputs refer to a stream of frames of digitized images are generated by optical system 1 (20) and optical system 2 (60) in a planar range sensor system 10, according to the present invention. In a preferred embodiment, optical system generates at least about 30 frames per second (fps). Higher frame rates are desirable in that at 30 fps, the tip of the user's finger or stylus can move several pixels while "typing" on virtual input device between two frames. Pixel map modules 200-1, 200-2 construct digital frames from OS1 and OS2 in memory associated with computational unit 70. Synchronizer module 210 ensures that the two optical systems produce frames of digitized images at approximately the same time. If desired, a double-buffering system may be implemented to permit construction of one frame while the previous frame (in time) is being processed by the other modules. Touch detection module 220 detects a touch (e.g., intersection of a user finger or stylus with the optical plane sensed by OS1) when the outline of a fingertip or stylus appears in a selected row of the frame. When a touch is detected, tip detection module 230 records the outline of the corresponding fingertip into the appropriate pixel map, 200-1 or 200-2. In FIG. 4, in a structured-light embodiment where OS1 is a light beam generator, no pixel map is produced, and touch detection will use input from OS2 rather than from OS1.

Touch position module 240 uses tip pixel coordinates from tip detection module 230 at the time a touch is reported from touch detection module 220 to find the (x-z) coordinates of the touch on the touch surface. As noted, a touch is tantamount to penetration of plane 30 associated with an optical emitter OS1 in a structured-light embodiment, or in a passive light embodiment, associated with a plane of view of a camera OS1. Mathematical methods to convert the pixel coordinates to the X-Z touch position are described elsewhere herein.

Key identification module 260 uses the X-Z position of a touch and maps the position to a key identification using a keyboard layout table 250 preferably stored in memory associated with computation unit 70. Keyboard layout table 250 typically defines the top/bottom/left and right coordinates of each key relative to a zero origin. As such, a function of key identification module 260 is to perform a search of table 250 and determine which key contains the (x,z) coordinates of the touch point. When the touched (virtual) key is identified, translation module 270 maps the key to a predetermined KEYCODE value. The KEYCODE value is output or passed to an application that is being executed on the companion device or system 80 (executing on a companion device) that is waiting to receive a notification of a keystroke event. The application under execution interprets the keystroke event and assigns a meaning to it. For instance, a text input application uses the value to determine what symbol was typed. An electronic piano application determines what musical note was pressed and plays that note, etc.

Alternatively, as shown in FIG. 4, the X-Z touch coordinates can be passed directly to application 280. Application 280 could use the coordinate data to control the position of a cursor on a display in a virtual mouse or virtual trackball embodiment, or to control a source of digital ink whose locus is shown on a display for a drawing or hand-writing type application in a virtual pen or virtual stylus embodiment.

Figure 5A:
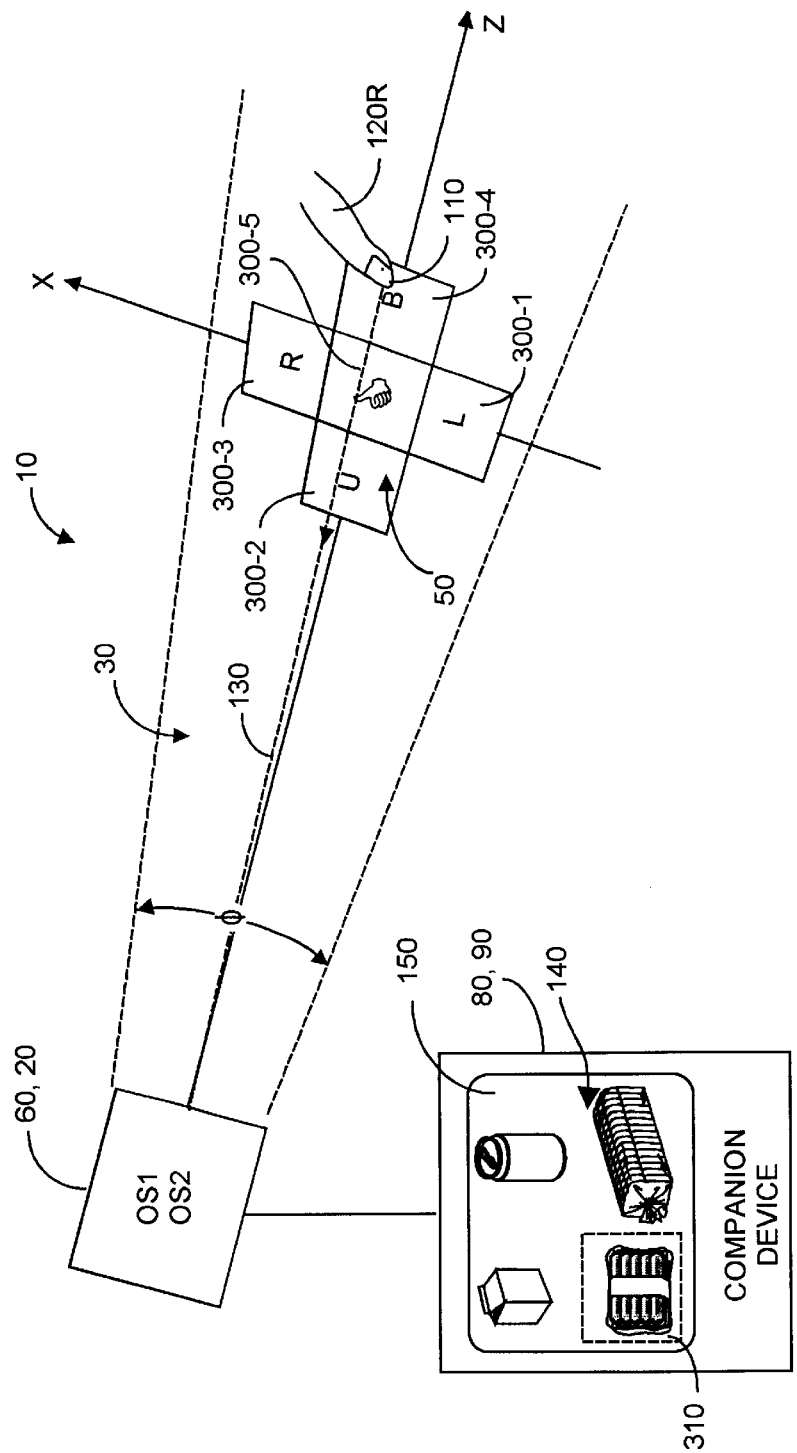
FIG. 5A depicts an embodiment wherein the virtual device has five user-selectable regions and the companion device is a monitor, according to the present invention.

FIG. 5A is a simplified view of system 10 in which virtual device 50 is now a control with five regions, and in which the companion device 80, 90 includes a monitor. In this embodiment, companion device 80 or 90 is shown with a display 150 that may include icons 140, one of which is surrounded by a cursor 310 and a user can move using virtual device 50', here a virtual trackball or mouse. For example, within virtual device 50', if a portion of the user's hand 120R (or stylus) presses virtual region 300-1, the displayed cursor 310 on companion device 80, 90 will be commanded to move to the left. If virtual region 300-2 is pressed, the cursor should move upward. If virtual region 300-3 is pressed, the cursor should move to the right, e.g., to "select" the icon of a loaf of bread, and if virtual region 300-4 is pressed, the cursor should move towards the bottom of the display on device 80, 90. If user presses the fifth region 300-5, a "thumbs up" region, companion device 80, 90 knows that the user-selection is now complete. In FIG. 5A, if the user now presses region 300-5, the "hotdog" icon is selected. If device 80, 90 were a kiosk in a supermarket, for example, selecting the "hotdog" icon might bring up a display showing where in the market hotdogs are to be found, or the price of various brands of hot dogs being sold, or device 80, 90 might even dispense hotdogs. If device 80, 90 were used in a transportation setting, the icons (or words) might be various destinations, and device 80 or 90 could indicate routes, schedules, and fares to the destinations, and could even dispense tickets for use on a bus, a subway, an airline, a boat, etc. A user could, for example, press two regions of input device 50' representing trip originating point and trip destination point, whereupon system 10 could cause a display of appropriate transportation vehicles, schedules, fares, etc. to be displayed and, if desired, printed out. It will be appreciated that information generated by system 10 may simply be raw (x,z) coordinates that a software application executed by a companion device may use to reposition a cursor or other information on a display.

It is understood in FIG. 5A that virtual device 50' is passive; its outline may be printed or painted onto an underlying work surface, or perhaps its outline can be projected by system 10. The various regions of interest in virtual device 50 may be identified in terms of coordinates relative to the x-z plane. Consider the information in Table 1, below, which corresponds to information in keyboard layout 250 in FIG. 4:

TABLE 1

| REGION | TOP | BOTTOM | LEFT | RIGHT |
| --- | --- | --- | --- | --- |
| U | −2 | −1 | −1 | 1 |
| B | 1 | 2 | −1 | 1 |
| R | −1 | 1 | 1 | 2 |
| L | −1 | 1 | −2 | −1 |
| ♣ | −1 | 1 | −1 | 1 |

When the user's finger (or stylus) touches a region of virtual input device 50, touch position module 240 (see FIG. 4) determines the (x,z) coordinates of the touch point 110. In FIG. 5, touch point 110 is within "B" region 300-4. Key identification module 260 uses the keyboard layout 250 information, in this example as shown in Table 1, to determine where in the relevant (x,z) plane the touch point coordinates occur. By way of example, assume touch coordinates (x,z) are (1.5,0.5). A search routine preferably stored in memory associated with unit 70 (see FIG. 1A) and executed by unit 70 determines that 1<x<2, and −1<z<1. Searching information in Table 1, the key identification module will determine that touch point 110 falls within entry B. In this example, companion device 80 and 90 receives data from system 10 advising that region B has been touched. Processor unit 70 in system 10 can cause the companion device to receive such other information as may be required to perform the task associated with the event, for example to move the cursor downward on the display.

Figure 5B:
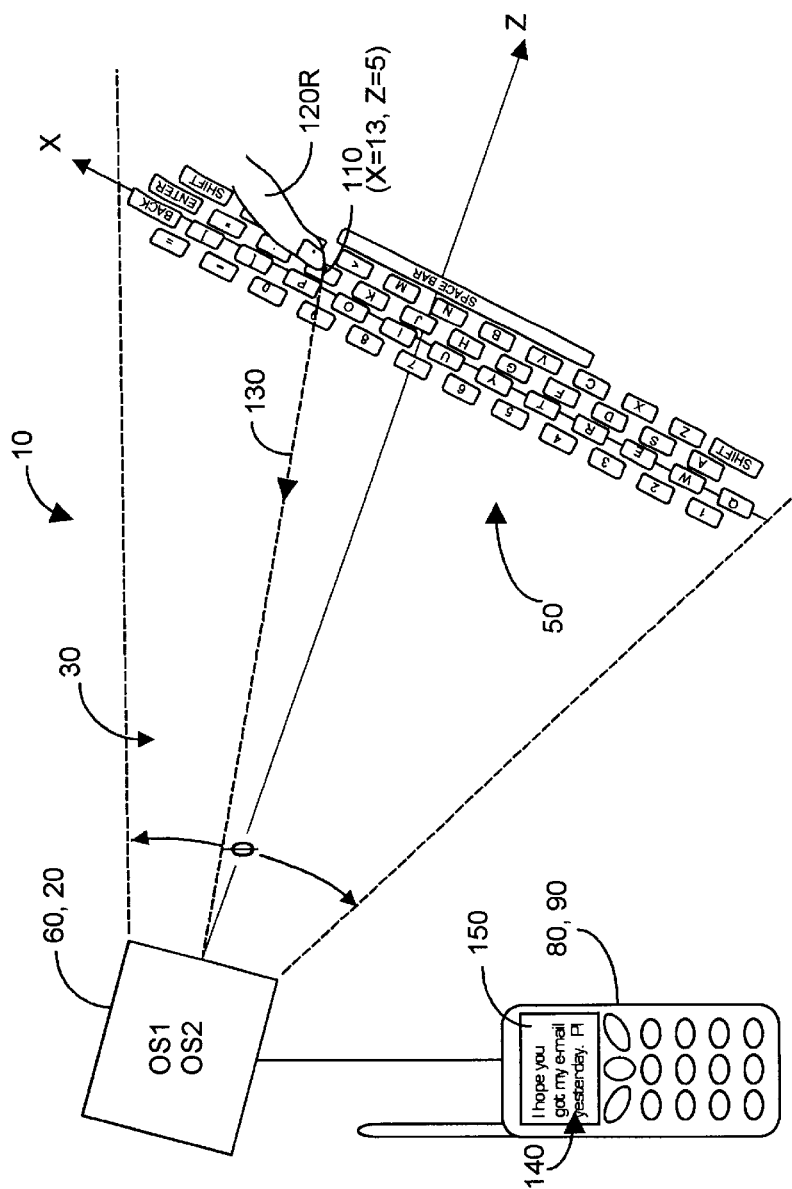
FIG. 5B depicts an embodiment wherein the virtual device is a computer keyboard and the companion device is a mobile transceiver, according to the present invention.

FIG. 5B depicts an embodiment of system 10 similar to that shown in FIG. 1A. In FIG. 5B the virtual input device 50 is a computer keyboard and the companion device 80, 90 is a mobile transceiver, a cellular telephone for example. It is to be understood that system 10 could in fact be implemented within device 80, 90. As such, OS1 might emit fan-beam 30 from a lower portion of device 80, 90, and OS2 might be disposed in an upper portion of the same device. The virtual input device 50 could, if desired, be projected optically from device 80, 90. Alternatively virtual input device 50 might be printed on a foldable substrate, e.g., plastic, paper, etc. that can be retained within device 80, 90, then removed and unfolded or unrolled and placed on a flat work surface in front of device 80, 90. The location of virtual input device 50 in front of device 80, 90 would be such that OS1 can emit a fan-beam 30 encompassing the virtual input device, and OS2 can detect intersection 110 of an object, e.g., a user's finger or cursor, etc., with a location in the fan-beam overlying any region of interest in virtual input device 50.

In FIG. 5B, OS2 will not detect reflected optical energy until object 120R intercepts fan-beam 130, whereupon some optical energy emitted by OS1 will be reflected (130) and will be detected by OS2. Relative to the (x,z) coordinate system shown in FIG. 1A, the point of interception 110 is approximately location (13,5). Referring to FIG. 4, it is understood that keyboard layout table 250 will have at least one entry for each virtual key, e.g., "1", "2", . . . "Q", "W", . . . "SHIFT" defined on virtual input device 50. An entry search process similar to that described with respect to FIG. 5A is carried out, preferably by unit 70, and the relevant virtual key that underlies touch point 110 can be identified. In FIG. 5B, the relevant key is "I", which letter "I" is shown on display 150 as part of e-mail message text 140 being input into cellular telephone 80, 90 by a portion of the user's hand 120R (or by a stylus). The ability to rapidly touch-type messages into cellular telephone 80, 90 using virtual keyboard 50, as contrasted with laboriously inputting messages using the cellular telephone keypad will be appreciated.

Figure 5C:
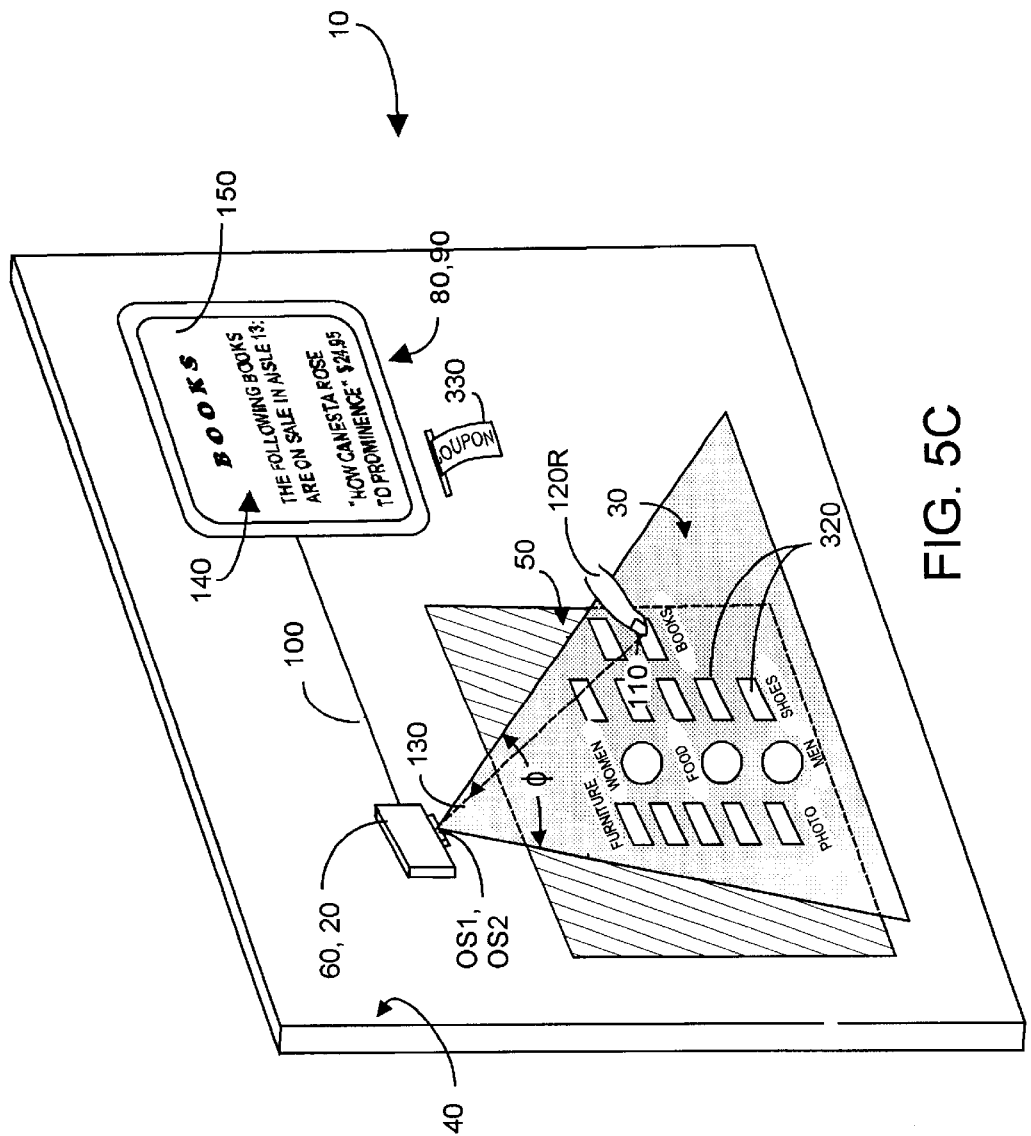
FIG. 5C depicts an embodiment wherein the virtual device is mounted or projected on a wall and the companion device is a monitor, according to the present invention.

In FIG. 5C, an embodiment of system 10 is shown in which the workspace 40 is a vertical wall, perhaps in a store or mall, and virtual input device 50 is also vertically disposed. In this embodiment, virtual input device 50 is shown with several icons and/or words 320 that when touched by a user's hand 120, e.g., at touch point 110, will cause an appropriate text and/or graphic image 140 to appear on display 150 in companion device 80, 90. In the example shown, icons 320 may represent locations or departments in a store, and display 150 will interactively provide further information in response to user touching of an icon region. In a mall, the various icons may represent entire stores, or department or regions within a store, etc. The detection and localization of touchpoints such as 110 is preferably carried out as has been described with respect to the embodiments of FIGS. 3A and 3B. Preferably processor unit 70 within system 10 executes software, also stored within or loadable into processor unit 70, to determine what icon or text portion of virtual input device 50 has been touched, and what commands and/or data should be communicated to host system 80, 90.

In the embodiment of FIG. 5C, if the virtual input device 50 is apt to be changed frequently, e.g., perhaps it is a menu in a restaurant where display 150 can provide detailed information such as calories, contents of sauces, etc., device 50 may be back projected from within wall 40. Understandably if the layout and location of the various icons 320 change, mapping information stored within unit 70 in system 10 will also be changed. The ability to rapidly change the nature and content of the virtual input device without necessarily be locked-into having icons of a fixed size in a fixed location can be very useful. If desired, some icons may indeed be fixed in size and location on device 50, and their touching by a user may be used to select a re-mapping of what is shown on input device 50, and what is mapped by software within unit 70. It is understood that in addition to simply displaying information, which may include advertisements, companion device 80, 90 may be used to issue promotional coupons 330 for users.

Figure 6:
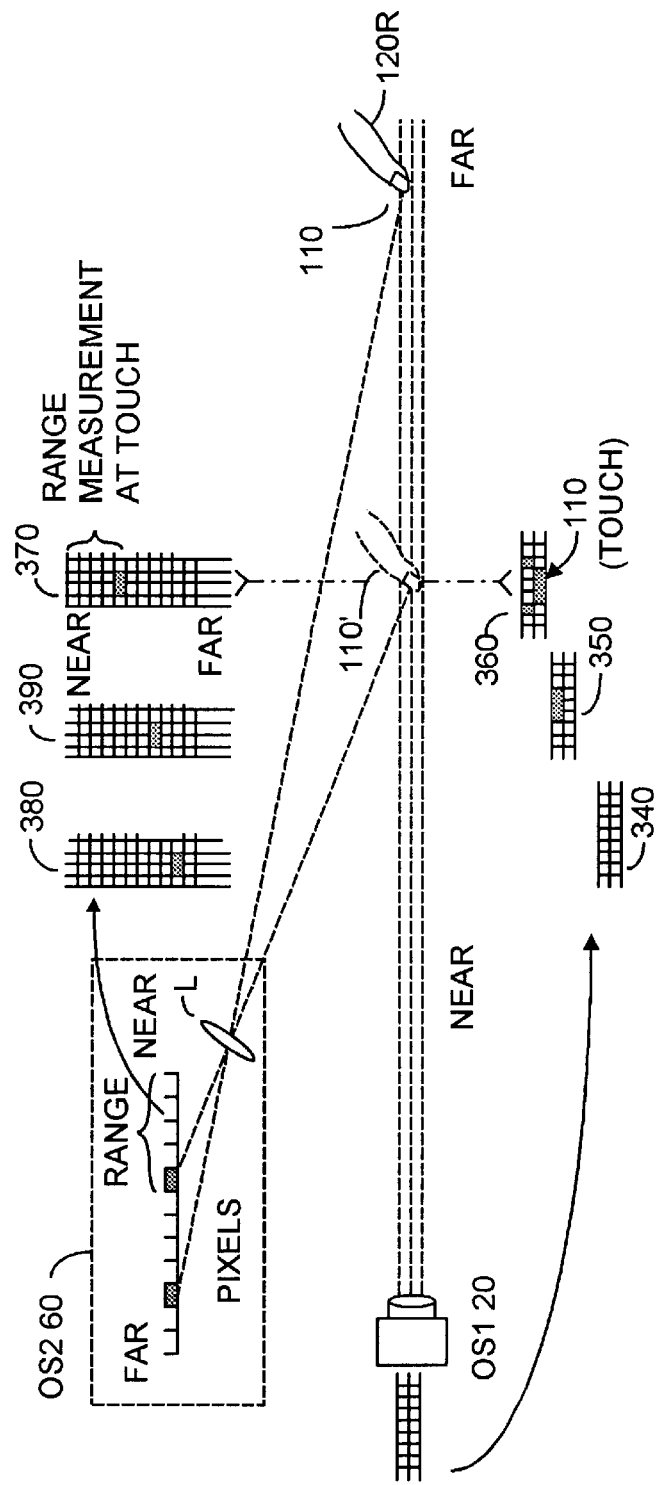
FIG. 6 depicts planar range sensing, according to the present invention.

Turning now to FIG. 6, the manner of registering a touch event and localizing its position is determined by system 10 in a manner, depending upon whether system 10 is a structured-light system or a passive light system. As noted earlier, in a structured-light system OS1 may be a line generating laser system, and in a passive light system, OS1 may be a digital camera. Each system defines a plane 30 that when intercepted by an object such as 120R will define a touch event whose (x,z) coordinates are to then be determined. Once the (x,z) coordinates of the virtual touch are determined, the present invention can decide what input or command was intended by the person using the system. Such input or command can be passed to a companion device, which device may in fact also house the present invention.

If system 10 is a passive light system, a touch event is registered when the outline of a fingertip appears in a selected frame row of OS1, a digital camera. The (x,z) plane 30 location of the touch is determined by the pixel position of the corresponding object tip (e.g., 120R) in OS2, when a touch is detected in OS1. As shown in FIG. 6, the range or distance from camera OS1 to the touch point is an affine function of the number of pixels from the "near" end of the pixel frame.

As noted, in a structured-light embodiment, OS1 will typically be a laser line generator, and OS2 will be a camera primarily sensitive to wavelength of the light energy emitted by OS1. As noted, this can be achieved by installing a narrowband light filter on OS2 such that only wavelength corresponding to that emitted by OS1 will pass. Alternatively, OS2 can be understood to include a shutter that opens and closes in synchronism to pulse output of OS1, e.g., OS2 can see optical energy only at time that OS1 emits optical energy. In either embodiment of a structured-light system, OS2 preferably will only detect objects that intercept plane 30 and thus reflect energy emitted by OS1.

In the above case, touch sense detection and range calculation are carried out by system 10. Thus, a touch event is registered when the outline of an object, e.g., fingertip 120R, appears within the viewing range of OS2. As in the above example, range distance may be calculated as an affine function of the number of pixels from the "near" end of pixel frame.

A further example of analytical steps carried out in FIG. 4 by the present invention will now be given. Assume that the virtual input device is a keyboard 50, such as depicted in FIG. 1A, and that system 10 is expected to output information comprising at least the scan code corresponding to the virtual key that the user has "touched" on virtual keyboard 50. In FIG. 1A and FIG. 2A, assume that the upper portion (e.g., the row with virtual keys "ESC", "F1", "F2", etc.) is a distance of about 20 cm from optical system OS1 20. Assume that camera OS2 60 is mounted on a PDA or other device 80 that is about 10 cm tall, and is placed at a known angle $\alpha_{1}=120°$ relative to the plane 30. Assume too that camera OS2 60 has a lens with a focal length of about 4 mm, and a camera sensor arrayed with 480 rows and 640 columns.

The Z coordinate of the upper left corner of virtual keyboard 50 is set by convention to be x=0 and z=0, e.g., (0,0). The homography H that maps points in the image to points on the virtual device depends on the tilt of camera OS2 60. An exemplary homography matrix for the configuration above is as follows:

$$H = \begin{bmatrix} 0.133 & -0.061 & 32.9 \\ -0.194 & 0.0 & 15.1 \\ 0.0 & 0.0 & 1.0 \end{bmatrix}.$$

The above matrix preferably need be determined only once during a calibration procedure, described elsewhere herein.

Figure 7:
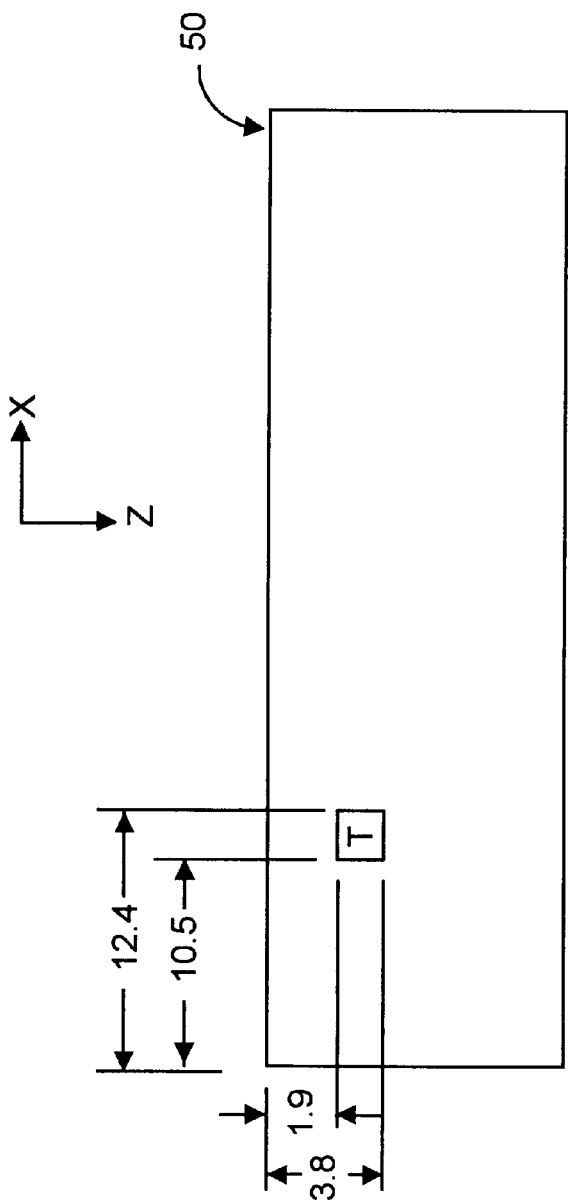
FIG. 7 depicts coordinate distance measurements used in an exemplary calculation of touch location for use in outputting corresponding information or data or command, according to the present invention.

Referring now to FIG. 1A and FIG. 7, assume that user 120L touches the region of virtual keyboard 50 corresponding to the letter "T", which letter "T" may be printed on a substrate to guide the user's fingers or may be part of an image of the virtual input device perhaps projected by system 10. Using the system of coordinates defined above, key "T" may be said to lie between horizontal coordinates $x_{min}$=10.5 and $x_{max}$=12.4 cm, and between vertical coordinates $Z_{min}$=1.9 and $z_{max}$=3.8 cm, as shown in FIG. 7.

Referring now to FIG. 6, before the user's finger 120L (or stylus) intersects the plane of sensor OS1 20, the latter detects no light, and sees an image made of black pixels, as illustrated shown in vignette 340 at the figure bottom. However, as soon as the user-object intersects optical plane 30, the intersection event or interface becomes visible to OS1 20. OS1 20 now generates an image similar to the one depicted in vignette 350 at the bottom of FIG. 6. When the downward moving tip 110 of user-object (e.g., finger 120L) reaches surface 40, more of the finger becomes visible. The finger contour may now be determined, e.g., by unit 70 using edge detection. Such determination is depicted at the bottom of FIG. 6 as "TOUCH" event vignette 360. Touch detection module 220 in FIG. 4 then determines that the user-object has touched surface 40, and informs tip detection module 230 of this occurrence.

As seen in FIG. 1A, the virtual 'T'key is found in the second row of virtual keyboard 50, and is therefore relatively close to sensor OS1 20. In FIG. 6, this situation corresponds to the fingertip in position 110'. As further shown in FIG. 6, the projection of the bottom of the fingertip position 110' onto the sensor of optical system OS2 60 is relatively close to the top of the image. The edge of the fingertip image thus produced is similar that shown in vignette 370 at the top of FIG. 6. In vignette 370, the two gray squares shown represent the bottom edge pixels of the fingertip.

Had the user instead struck the spacebar or some other key closer to the bottom of virtual keyboard 50, that is, further away from the sensor OS1 20, the situation depicted by fingertip position 110 in FIG. 6 would have arisen. Such a relatively far location on the virtual keyboard is mapped to a pixel closer to the bottom of the image, and an edge image similar to that sketched in vignette 380 at the top of FIG. 6 would have instead arisen. Intermediate virtual key contact situations would produce edge images that are more similar to that depicted as vignette 390 at the top of FIG. 6.

In the above example in which virtual key 'T' is pressed, tip detection module 230 in FIG. 4 runs an edge detection algorithm, and thereby finds the bottom center of the "blob" representing the generalized region of contact to be at image row 65 and column 492. The homogeneous image coordinate vector p, given below is therefore formed:

$$p = \begin{bmatrix} 65 \\ 492 \\ 1 \end{bmatrix}$$

The homogeneous image coordinate vector p is then multiplied by the homography matrix H to yield the coordinates P of the user fingertip in the frame of reference of the virtual keyboard:

$$P = Hp = \begin{bmatrix} 0.133 \times 65 - 0.061 \times 492 + 32.9 \times 1 \\ -0.194 \times 65 + 0.0 \times 492 + 15.1 \times 1 \\ 0.0 \times 65 + 0.0 \times 492 + 1.0 \times 1 \end{bmatrix} \cong \begin{bmatrix} 11.53 \\ 2.49 \\ 1.00 \end{bmatrix}.$$

The user-object or finger 120L is thus determined to have touched virtual keyboard 50 at a location point having coordinates x=11.53 and z=2.49 cm. Key identification module 260 in FIG. 4 searches keyboard layout 250 for a key such that $x_{min} \leq 1153 < x_{max}$ and $y_{min} \leq 249 < y_{max}$.

These conditions are satisfied for the virtual "T" key because 10.5<11.53<12.4, and 1.9<2.49<3.8. Referring to FIG. 4, key identification module 260 therefore determines that a user-object is touching virtual key "T" on virtual keyboard 50, and informs translation module 270 of this occurrence.

The occurrence need not necessarily be a keystroke. For example, the user-object or finger may have earlier contacted the "T" key and may have remained in touch contact with the key thereafter. In such case, no keystroke event should be communicated to application 280 running on the companion device 80 or 90.

Key translation module 270 preferably stores the up-state or down-state of each key internally. This module determines at every frame whether any key has changed state. In the above example, if the key "T" is found to be in the down-state in the current frame but was in the up-state in the previous frame, translation module 270 sends a KEYCODE message to application 280. The KEYCODE code will include a 'KEY DOWN' event identifier, along with a 'KEY ID' tag that identifies the "T" key, and thereby informs application 280 that the "T" key has just be "pressed" by the user-object. If the "T" key were found to have been also in the down-state during previous frames, the KEYCODE would include a 'KEY HELD' event identifier, together with the 'KEY ID' associated with the "T" key. Sending the 'KEY HELD' event at each frame (excepting the first frame) in which the key is in the down-state frees application 280 from having to maintain any state about the keys. Once the "T" key is found to be in the up-state in the current frame but was in the down-state in previous frames, translation module 270 sends a KEYCODE with a 'KEY UP' event identifier, again with a 'KEY ID' tag identifying the "T" key, informing application 280 that the "T" key was just "released" by the user-object.

From the foregoing, it will be appreciated that it suffices that frame images comprise only the tips of the user-object, e.g., fingertips. The various embodiments of the present invention use less than full three-dimensional image information acquired from within a relatively shallow volume defined slightly above a virtual input or virtual transfer device. A system implementing these embodiments can be relatively inexpensively fabricated and operated from a self-contained battery source. Indeed, the system could be constructed within common devices such as PDAs, cellular telephones, etc. to hasten the input or transfer of information from a user. As described, undesired effects from ambient light may be reduced by selection of wavelengths in active light embodiments, by synchronization of camera(s) and light sources, by signal processing techniques that acquire and subtract-out images representing background noise.

Modifications and variations may be made to the disclosed embodiments without departing from the subject and spirit of the invention as defined by the following claims.

What is claimed is:

1. A method to obtain information from an interaction of at least one user-object with a virtual input device defined on a device plane, the method comprising the following steps:

(a) generating with a fan beam a plane of light substantially parallel to and spaced-above said device plane a distance sufficiently small such that penetration of said plane of light by said at least one user-object is equivalent to interactingly touching a virtual input device position on said device plane;

(b) using a single sensor that acquires data representing a single image at a given time to determine from light reflected from said plane of light if and when at least a portion of said at least one user-object penetrates said plane of light and thus interactingly touches a position on said device plane; and (c) for each contact with said device plane determined to occur at step (b) determining contact position relative to said single sensor;

wherein a function of said virtual input device associated with each contact position determined at step (c) is ascertainable.

2. The method of claim 1, further including:

(d) transferring to a companion device information commensurate with contact position determined at step (c) relative to said virtual input device;

wherein Interaction of said at least one user-object with said virtual input device affects operation of said companion device.

3. The method of claim 2, wherein said companion device includes at least one of (i) a PDA, (ii) a portable communication device, (iii) an electronic device, (iv) an electronic game device, and (v) a musical instrument, and said virtual input device is at least one of (I) a virtual keyboard, (II) a virtual mouse, (III) a virtual trackball, (IV) a virtual pen, (V) a virtual trackpad, and (VI) a user-interface selector.

4. The method of claim 2, wherein:

said user-object includes at least a portion of a user's hand;

said virtual input device includes a virtual keyboard; and said companion device includes at least one of (i) a PDA, (ii) a mobile telephone, and (iii) a computer.

5. The method of claim 2, wherein:

said user-object includes at least a portion of a user's hand;

said virtual input device includes a virtual mouse, and said companion device includes at least one of (i) a PDA, (ii) a mobile telephone, and (iii) a computer.

6. The method of claim 2, wherein:

said user-object includes at least a portion of a user's hand;

said virtual input device includes a virtual trackball, and said companion device includes at least one of (i) a PDA, (ii) a mobile telephone, and (iii) a computer.

7. The method of claim 2, wherein:

said user-object includes at least a portion of a user's hand;

said virtual input device includes a virtual pen, and said companion device includes at least one of (i) a PDA, (ii) a mobile telephone, and (iii) a computer.

8. The method of claim 1, wherein step (a) includes generating said plane of light using optical energy, and wherein step (b) includes detecting a reflected portion of said optical energy when at least a portion of said user-object penetrates said plane of light.

9. The method of claim 1, wherein at least one of step (b) and step (c) is carried out using triangulation analysis.

10. The method of claim claim 1, wherein said virtual input device is mapped to a work surface selected from at least one of (i) a table top, (ii) a desk top, (iii) a wall, (iv) a point-of-sale appliance, (v) a point-of-service appliance, (vi) a kiosk, (vii) a surface in a vehicle, (viii) a projected display, (ix) a physical display, (x) a CRT, and (xi) an LCD.

11. The method of claim 1, wherein step (b) includes providing a camera having a lens with a lens optical axis, and providing an image plane, and further including improving at least one of resolution and depth of field of said camera by tilting said image plane relative to said lens optical axis.

12. The method of claim 1, wherein:

step (a) includes defining said plane of light using an optical source; and step (b) includes providing a camera to sense penetration of said plane of light.

13. The method of claim 12, further including:

synchronizing operation of said optical source and said camera;

wherein effects of ambient light upon accuracy of information obtained at at least one of step (b) and step (c) are reduced.

14. The method of claim 12, wherein said optical source emits optical energy bearing a signature used to reject ambient light.

15. The method of claim 1, wherein:

step (b) includes acquiring ambient light information generated by ambient light by determining when said user-object is distant from said plane of light; and at least one of step (b) and step (c) includes subtracting said ambient light information from information acquired when said user-object interacts with said virtual input device;

wherein effects of ambient light are reduced.

16. The method of claim 1, wherein said user-object includes at least a portion of a user's hand.

17. The method of claim 1, wherein said virtual input device includes a virtual keyboard.

18. The method of claim 1, wherein said virtual input device includes a virtual mouse.

19. The method of claim 1, wherein said virtual input device includes a virtual trackball.

20. The method of claim 1, wherein said virtual input device a virtual pen.

* * * * *

UNITED STATES PATENT AND TRADEMARK OFFICE
CERTIFICATE OF CORRECTION

PATENT NO. : 6,710,770 B2
DATED : March 23, 2004
INVENTOR(S) : Carlo Tomasi et al.

It is certified that error appears in the above-identified patent and that said Letters Patent is hereby corrected as shown below:

Title page,
Item [57], ABSTRACT,
Lines 9-10, change "OS1 is preferably a digital camera" should read -- OS2 is preferably a digital camera --;

Column 2,
Line 14, change "U.S. Patent No. ___" to -- U.S. Pat. No. 6,323,942 --;

Column 4,
Line 26, change "sense plane" to -- sensed plane --;
Line 45, change "device or systems" to -- devices or systems --;

Column 10,
Line 40, change "planar and moved to project" to -- planar and project --;

Column 11,
Line 11, change "when OS1 recognizes" to -- when OS2 recognizes --;
Line 31, change "(XZ)" to -- (x, z) --;

Column 12,
Line 65, change "will including" to -- will include --;
Line 66, change "response to other wavelengths are" to -- response to other wavelength is --;

Column 13,
Line 17, change "the term $d(c(x, z), s_t)$" to -- the terms $d(c(x, z), s_b(x, z))$ and $d(c(x, z), s_t)$ --;

Column 14,
Line 10, change "may be found at" to -- may be found in --;
Line 15, change "lens S" to -- Lens L --;
Line 32, change "good focusing than" to -- better focusing than --;
Line 44, change "As the left" to -- At the left --;
Line 45, change "OS2 30" to -- OS2 60 --;
Lines 47-48, change "images are" to -- images that are --;

UNITED STATES PATENT AND TRADEMARK OFFICE
CERTIFICATE OF CORRECTION

PATENT NO. : 6,710,770 B2
DATED : March 23, 2004
INVENTOR(S) : Carlo Tomasi et al.

It is certified that error appears in the above-identified patent and that said Letters Patent is hereby corrected as shown below:

Column 19,
Line 28, change "similar that shown" to -- similar to that shown --;
Line 67, change "1153" to -- 11.53 --;
Line 67, change "249" to -- 2.49 --;

Column 22,
Line 5, change "claim claim 1" to -- claim 1 --; and
Line 51, change "device a virtual pen" to -- device includes a virtual pen --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,710,770 B2
DATED : March 23, 2004
INVENTOR(S) : Carlo Tomasi et al.

It is certified that error appears in the above-identified patent and that said Letters Patent is hereby corrected as shown below:

Title page,
Item [57], ABSTRACT,
Lines 9-10, change "OS1 is preferably a digital camera" should read -- OS2 is preferably a digital camera --;

Column 2,
Line 14, change "U.S. Patent No. ___" to -- U.S. Pat. No. 6,323,942 --;

Column 4,
Line 26, change "sense plane" to -- sensed plane --;
Line 45, change "device or systems" to -- devices or systems --;

Column 10,
Line 40, change "planar and moved to project" to -- planar and project --;

Column 11,
Line 11, change "when OS1 recognizes" to -- when OS2 recognizes --;
Line 31, change "(XZ)" to -- (x, z) --;

Column 12,
Line 65, change "will including" to -- will include --;
Line 66, change "response to other wavelengths are" to -- response to other wavelengths is --;

Column 13,
Line 17, change "the term $d(c(x, z), s_t)$" to -- the terms $d(c(x, z), s_b(x, z))$ and $d(c(x, z), s_t)$ --;

Column 14,
Line 10, change "may be found at" to -- may be found in --;
Line 15, change "lens S" to -- Lens L --;
Line 32, change "good focusing than" to -- better focusing than --;
Line 44, change "As the left" to -- At the left --;
Line 45, change "OS2 30" to -- OS2 60 --;
Lines 47-48, change "images are" to -- images that are --;

UNITED STATES PATENT AND TRADEMARK OFFICE
CERTIFICATE OF CORRECTION

PATENT NO.    : 6,710,770 B2
DATED         : March 23, 2004
INVENTOR(S)   : Carlo Tomasi et al.

It is certified that error appears in the above-identified patent and that said Letters Patent is hereby corrected as shown below:

Column 19,
Line 28, change "similar that shown" to -- similar to that shown --;
Line 67, change "1153" to -- 11.53 --;
Line 67, change "249" to -- 2.49 --;

Column 22,
Line 5, change "claim claim 1" to -- claim 1 --; and
Line 51, change "device a virtual pen" to -- device includes a virtual pen --.

This certificate supersedes Certificate of Correction issued July 20, 2004.

Signed and Sealed this

Third Day of May, 2005

JON W. DUDAS
*Director of the United States Patent and Trademark Office*